United States Patent
Zhang et al.

(10) Patent No.: US 11,229,016 B2
(45) Date of Patent: Jan. 18, 2022

(54) PHYSICAL UPLINK SHARED CHANNEL (PUSCH) DESIGN WITH POWER SPECTRAL DENSITY (PSD) PARAMETERS IN NEW RADIO-SPECTRUM SHARING (NR-SS)

(71) Applicant: QUALCOMM Incorporated, San Diego, CA (US)

(72) Inventors: Xiaoxia Zhang, San Diego, CA (US); Kapil Bhattad, Bangalore (IN); Jing Sun, San Diego, CA (US); Seyed Ali Akbar Fakoorian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 82 days.

(21) Appl. No.: 16/048,705

(22) Filed: Jul. 30, 2018

(65) Prior Publication Data

US 2019/0090231 A1    Mar. 21, 2019

(30) Foreign Application Priority Data

Sep. 20, 2017  (IN) .............................. 201741033325

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0007* (2013.01); *H04L 5/0037* (2013.01);
(Continued)

(58) Field of Classification Search
None
See application file for complete search history.

(56) References Cited

U.S. PATENT DOCUMENTS

| | | | |
|---|---|---|---|
| 2008/0123590 A1* | 5/2008 | Jung | ..................... H04L 5/0053 370/329 |
| 2010/0177722 A1* | 7/2010 | Guvenc | ............... H04W 52/244 370/329 |

(Continued)

FOREIGN PATENT DOCUMENTS

| | | |
|---|---|---|
| GB | 2547030 A | 8/2017 |
| WO | WO-2018080758 A1 | 5/2018 |

OTHER PUBLICATIONS

International Search Report and Written Opinion—PCT/US2018/044643—ISA/EPO—dated Oct. 9, 2018.

(Continued)

*Primary Examiner* — Kenny S Lin
*Assistant Examiner* — Richard Schnell
(74) *Attorney, Agent, or Firm* — Shankar Krithivasan

(57) ABSTRACT

Wireless communications systems and methods related to improving multiplexing capability in a frequency spectrum are provided. A first wireless communication device obtains a configuration for communicating a communication signal in a frequency spectrum. The configuration is based on at least a number of wireless communication devices scheduled to communicate in a time period. The configuration indicates resources in the frequency spectrum over the time period and a frequency distribution mode of the resources. The first wireless communication device communicates, with a second wireless communication device, the communication signal in the frequency spectrum during the time period based on the configuration.

27 Claims, 16 Drawing Sheets

(51) Int. Cl.
*H04L 27/26* (2006.01)
*H04W 72/02* (2009.01)
*H04W 52/50* (2009.01)
*H04W 52/34* (2009.01)

(52) U.S. Cl.
CPC .......... *H04L 5/0048* (2013.01); *H04L 5/0066* (2013.01); *H04L 5/0092* (2013.01); *H04L 27/2602* (2013.01); *H04W 72/02* (2013.01); H04L 5/0053 (2013.01); H04L 27/2613 (2013.01); H04L 27/2614 (2013.01); H04W 52/346 (2013.01); H04W 52/50 (2013.01); H04W 72/0453 (2013.01)

(56) References Cited

U.S. PATENT DOCUMENTS

| | | | | |
|---|---|---|---|---|
| 2011/0243012 | A1* | 10/2011 | Luo | H04L 5/0055 370/252 |
| 2014/0098781 | A1 | 4/2014 | Vos et al. | |
| 2015/0305041 | A1* | 10/2015 | Kim | H04W 72/085 370/329 |
| 2017/0164352 | A1 | 6/2017 | Yang et al. | |
| 2019/0059071 | A1* | 2/2019 | Khoryaev | H04W 64/006 |
| 2020/0169375 | A1* | 5/2020 | Yi | H04L 5/001 |

OTHER PUBLICATIONS

Nokia., et al., "Increasing PUSCH spectral efficiency", 3GPP Draft; R1-1707865, 3rd Generation Partnership Project (3GPP), Mobile Competence Centre; 650, Route Des Lucioles; F-06921 Sophia-Antipolis Cedex; France, vol. RAN WG1, No. Hangzhou, China; 20170515-20170519 May 5, 2017 (May 5, 2017), XP051261317, 5 pages, Retrieved from the Internet: URL: http://www.3gpp.org/ftp/tsg_ran/WG1_RL1/TSGR1_89/Docs/ [retrieved on May 5, 2017].

QUALCOMM Incorporated: "Increased PUSCH Spectral Efficiency", 3GPP Draft; R1-1712803, 3rd Generation Partnership Project (3GPP), Mobile Competence Centre; 650, Route Des Lucioles; F-06921 Sophia-Antipolis Cedex; France, vol. RAN WG1, No. Prague, Czechia; 20170821-20170825, Aug. 20, 2017 (Aug. 20, 2017), XP051315615, 4 pages, Retrieved from the Internet: URL: http://www.3gpp.org/ftp/Meetings_3GPP_SYNC/RAN1/Docs/ [retrieved on Aug. 20, 2017].

Samsung: "Details on Resource Pool design", 3GPP Draft; R1-164764, 3rd Generation Partnership Project (3GPP), Mobile Competence Centre; 650, Route Des Lucioles; F-06921 Sophia-Anti Polis Cedex; France, vol. RAN WG1, No. Nanjing, China; May 14, 2016, XP051089924, Retrieved from the Internet: URL:http://www.3gpp.org/ftp/tsg_ran/WG1_RL1/TSGR1_85/Docs/ (retrieved on May 14, 2016], 3 pages.

* cited by examiner

PHYSICAL UPLINK SHARED CHANNEL (PUSCH) DESIGN WITH POWER SPECTRAL DENSITY (PSD) PARAMETERS IN NEW RADIO-SPECTRUM SHARING (NR-SS)

CROSS REFERENCE TO RELATED APPLICATIONS

The present application claims priority to and the benefit of the India Patent Application No. 201741033325, filed Sep. 20, 2017, which is hereby incorporated by reference in its entirety as if fully set forth below and for all applicable purposes.

TECHNICAL FIELD

This application relates to wireless communication systems and methods, and more particularly to improving uplink (UL) multiplexing capability in a frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

Some spectrums may have certain PSD requirements. For example, the European Telecommunications Standard Institute (ETSI) document EN 301 893 V2.1.1 specifies various PSD limits for sub-6 GHz frequency bands and the ETSI draft document EN 302 567 V2.0.22 specifies a maximum equivalent isotropic radiated power (EIRP) and an EIRP density for 60 GHz frequency bands. Some other frequency bands, such as citizens broadband radio service (CBRS) bands at about 3.5 GHz, may not restrict transmissions to a particular PSD limit. In general, different spectrums may have different PSD requirements and/or different bandwidth occupancy requirements.

One approach to meeting the PSD requirement of a frequency spectrum and allowing a wireless communication device to transmit in the frequency spectrum at a full transmit power is to spread the frequency occupancy of a transmission signal over a wider bandwidth. However, the spreading of the frequency occupancy to a wider bandwidth reduces the number of wireless communication devices that can be frequency-multiplexed in the frequency spectrum.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes obtaining, by a first wireless communication device, a configuration for communicating a communication signal in a frequency spectrum, wherein the configuration is based on at least a number of wireless communication devices scheduled to communicate in a time period and indicates resources in the frequency spectrum over the time period and a frequency distribution mode of the resources; and communicating, by the first wireless communication device with a second wireless communication device, the communication signal in the frequency spectrum during the time period based on the configuration.

In an additional aspect of the disclosure, an apparatus includes a processor configured to obtain a configuration for communicating a communication signal in a frequency spectrum, wherein the configuration is based on at least a number of wireless communication devices scheduled to communicate in a time period and indicates resources in the frequency spectrum over the time period and a frequency distribution mode of the resources; and a transceiver configured to communicate, with a second wireless communication device, the communication signal in the frequency spectrum during the time period based on the configuration.

In an additional aspect of the disclosure, a computer-readable medium having program code recorded thereon, the program code includes code for causing a first wireless communication device to obtain a configuration for communicating a communication signal in a frequency spectrum, wherein the configuration is based on at least a number of wireless communication devices scheduled to communicate in a time period and indicates resources in the frequency spectrum over the time period and a frequency distribution mode of the resources; and code for causing the first wireless communication device to communicate, with a second wireless communication device, the communication signal in the frequency spectrum during the time period based on the configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
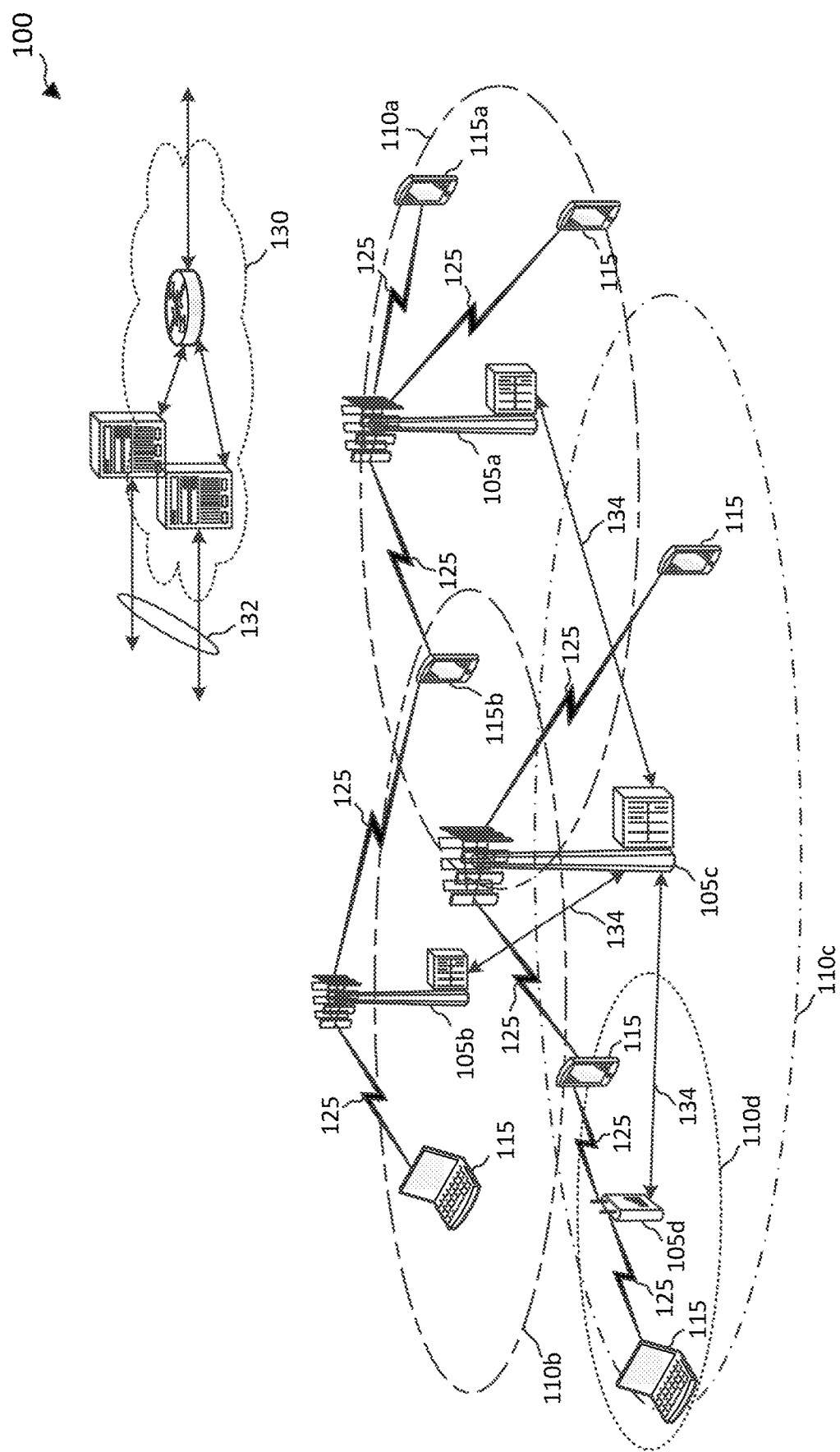
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present application describes mechanisms for improving uplink (UL) multiplexing capability in a frequency spectrum shared by multiple network operating entities. For example, the frequency spectrum may have a PSD requirement and an allocation may be required to spread over a minimum of M number of resource blocks (RBs) to meet the PSD requirement, where M is a positive integer. The disclosed embodiments divide RBs into mini-RBs and allocate UL resources in units of mini-RBs. A mini-RB may be formed from a subset of contiguous subcarriers within a RB. Alternatively, a mini-RB may be formed from a subset of distributed subcarriers within a RB. The distributed subcarriers may be spaced apart from each by at least one other subcarrier in the RB. In an embodiment, an allocation may include a set of mini-RBs located within K number of RBs, where K is positive integer greater than or equal to M. The K RBs may be contiguous in the frequency spectrum or may be spaced apart from each other by at least one other RB in the frequency spectrum.

In an embodiment, a base station (BS) may determine a configuration for a user equipment (UE) to transmit in the spectrum. The BS may allocate resources in units of mini-RBs and may determine a frequency distribution of the mini-RBs based on a number of UEs scheduled to communicate in a scheduling period, the number of transmission layers scheduled per UE, the PSD requirement, the subcarrier spacing (SCS), and/or the waveform used to communicate with the UEs.

In an embodiment, one or more symbols within a mini-RB may be designated for a reference signal transmission to facilitate channel equalization and demodulation at a receiver. In an embodiment, port-specific or transmission-layer specific reference signals may be used to enable a receiver to receive and detect transmissions from different transmission layers. In an embodiment, multiple reference signals may be transmitted on the same set of resources using scrambling codes (e.g., orthogonal codes). In an embodiment, multiple UEs may transmit communication signals on the same set of mini-RBs using CDM (e.g., with orthogonal spreading factors).

Aspects of the present application can provide several benefits. For example, the use of a finer allocation granularity at a mini-RB level may allow a greater number of UEs to be scheduled or multiplexed in a scheduling period. The use of scrambling codes for reference signal transmissions and the use of CDM for data transmissions allow multiple UEs to be scheduled on the same set of resources, and thus may further increase the number of UEs that can be scheduled or multiplexed within a scheduling period. While the disclosed embodiments may be described in the context of UL transmissions, the disclosed embodiments may be applied to DL transmissions. The disclosed embodiments may be suitable for use in any wireless communication network with any wireless communication protocol.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) and demodulation reference signals (DMRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 may perform transmit power control (TPC) instead of transmitting at a full power to allow for multiplexing in a frequency domain, multiplexing in a spatial domain, and/or interference management. For example, a UE 115 may reduce the transmit power to a minimum power sufficient to maintain a communication link 125 at a certain quality.

In an embodiment, the network 100 may operate over a shared channel, which may include a licensed spectrum, a shared spectrum, and/or an unlicensed spectrum, and may support dynamic medium sharing. A BS 105 or a UE 115 may reserve a transmission opportunity (TXOP) in a shared channel by transmitting a reservation signal prior to transmitting data in the TXOP. Other BSs 105 and/or other UEs 115 may listen to the channel and refrain from accessing the channel during the TXOP upon detection of the reservation signal. In some embodiments, the BSs 105 and/or the UEs 115 may coordinate with each other to perform interference management for further spectrum utilization improvements.

In an embodiment, the network 100 may operate over various frequency bands, for example, in frequency ranges between about 2 GHz to above 60 GHz. Different frequency bands may have different PSD requirements. As described above, the ETSI document EN 301 893 V2.1.1 specifies PSD requirements for various sub-6 GHz bands. For example, the frequency band between about 5150 MHz and about 5350 MHz may have a maximum allowable PSD level of about 10 dBm/MHz with TPC. The frequency band between about 5250 MHz and about 5350 MHz may have a maximum allowable PSD level of about 7 dBm/MHz without TPC. The frequency band between about 5150 MHz and about 5250 MHz may have a maximum allowable PSD level of about 10 dBm/MHz without TPC. The frequency band between about 5470 MHz and about 5725 MHz may have a maximum allowable PSD level of about 17 dBm/MHz with TPC and a maximum allowable PSD level of about 14 dBm/MHz without TPC. The ETSI draft document EN 302 567 V2.0.22 specifies a maximum EIRP and an EIRP density for 60 GHz bands. For example, a 60 GHz band may allow an EIRP density of about 13 dBm/MHz and an EIRP of about 40 dBm.

To satisfy a certain PSD requirement in a frequency spectrum, a transmitter (e.g., the BSs 105 and the UEs 115) may distribute the frequency occupancy of a transmission signal over a wider bandwidth. For example, a transmitter may transmit a signal over multiple narrow frequency bands spaced apart from each other in a frequency bandwidth at a higher power than transmitting the signal over contiguous frequencies. The distribution of the frequency occupancy may be in various granularities and configurations. For example, a BS 105 may determine a number of UEs 115 to be scheduled in a time period. The BS may assign resources with a particular frequency distribution mode to the UEs 115 based on a PSD requirement, the number of UEs 115 scheduled to communicate in the time period, the number of transmission layers scheduled for each UE 115, the SCS, and/or the waveform used for the scheduled communications, as described in greater detail herein.

Figure 2:
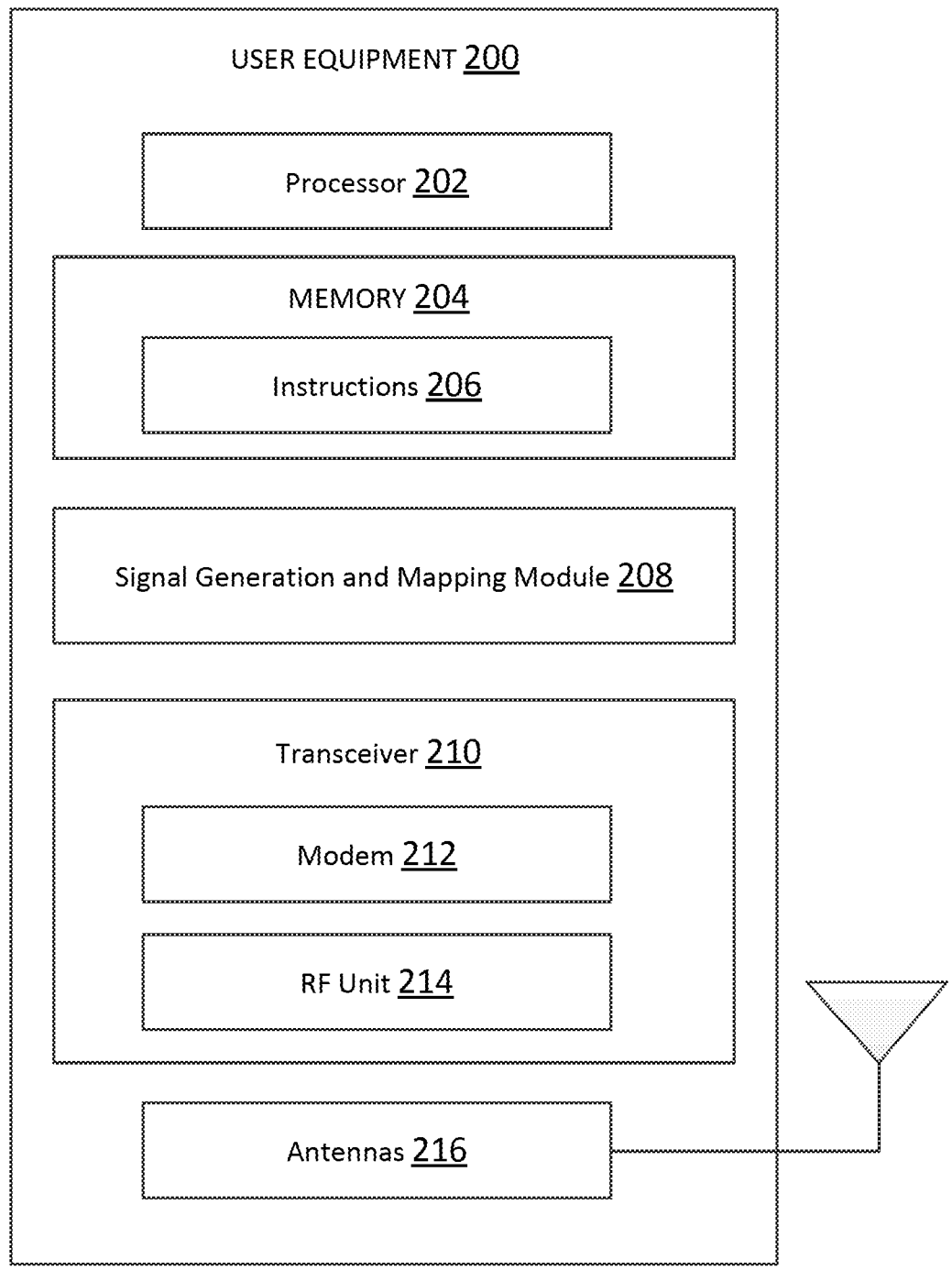
FIG. 2 is a block diagram of an exemplary user equipment (UE) according to embodiments of the present disclosure.

FIG. 2 is a block diagram of an exemplary UE 200 according to embodiments of the present disclosure. The UE 200 may be a UE 115 as discussed above. As shown, the UE 200 may include a processor 202, a memory 204, a signal generation and mapping module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The signal generation and mapping module 208 may be implemented via hardware, software, or combinations thereof. For example, the signal generation and mapping module 208 may be implemented as a processor, circuit, and/or instructions 206 stored in the memory 204 and executed by the processor 202. The signal generation and mapping module 208 may be used for various aspects of the present disclosure. For example, the signal generation and mapping module 208 is configured to receive a configuration indicating resources (e.g., mini-RBs) and a frequency distribution mode (e.g., mini-RBs formed from contiguous subcarriers or distributed subcarriers) of the resources for communicating a communication signal (e.g., a PUSCH signal), map the communication signal to the resources for transmissions, generate a reference signal (e.g., a DMRS) to facilitate the demodulation and decoding of the communication signal at a receiver, apply scrambling codes to the reference signal, and/or apply spreading codes to the communication signal, as described in greater detail herein.

As shown, the transceiver 210 may include the modem subsystem 212 and the RF unit 214. The transceiver 210 can be configured to communicate bi-directionally with other devices, such as the BSs 105. The modem subsystem 212 may be configured to modulate and/or encode the data from the memory 204, and/or the sequence generation and mapping module 208 according to a modulation and coding scheme (MCS), e.g., a low-density parity check (LDPC) coding scheme, a turbo coding scheme, a convolutional coding scheme, a digital beamforming scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 115 or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 115 to enable the UE 115 to communicate with other devices.

The RF unit 214 may provide the modulated and/or processed data, e.g. data packets (or, more generally, data messages that may contain one or more data packets and other information), to the antennas 216 for transmission to one or more other devices. This may include, for example, transmission of communication signals using mini-RBs having contiguous subcarriers, evenly spaced subcarriers, or unevenly spaced subcarriers according to embodiments of the present disclosure. The antennas 216 may further receive data messages transmitted from other devices. The antennas 216 may provide the received data messages for processing and/or demodulation at the transceiver 210. The antennas 216 may include multiple antennas of similar or different designs in order to sustain multiple transmission links. The RF unit 214 may configure the antennas 216.

Figure 3:
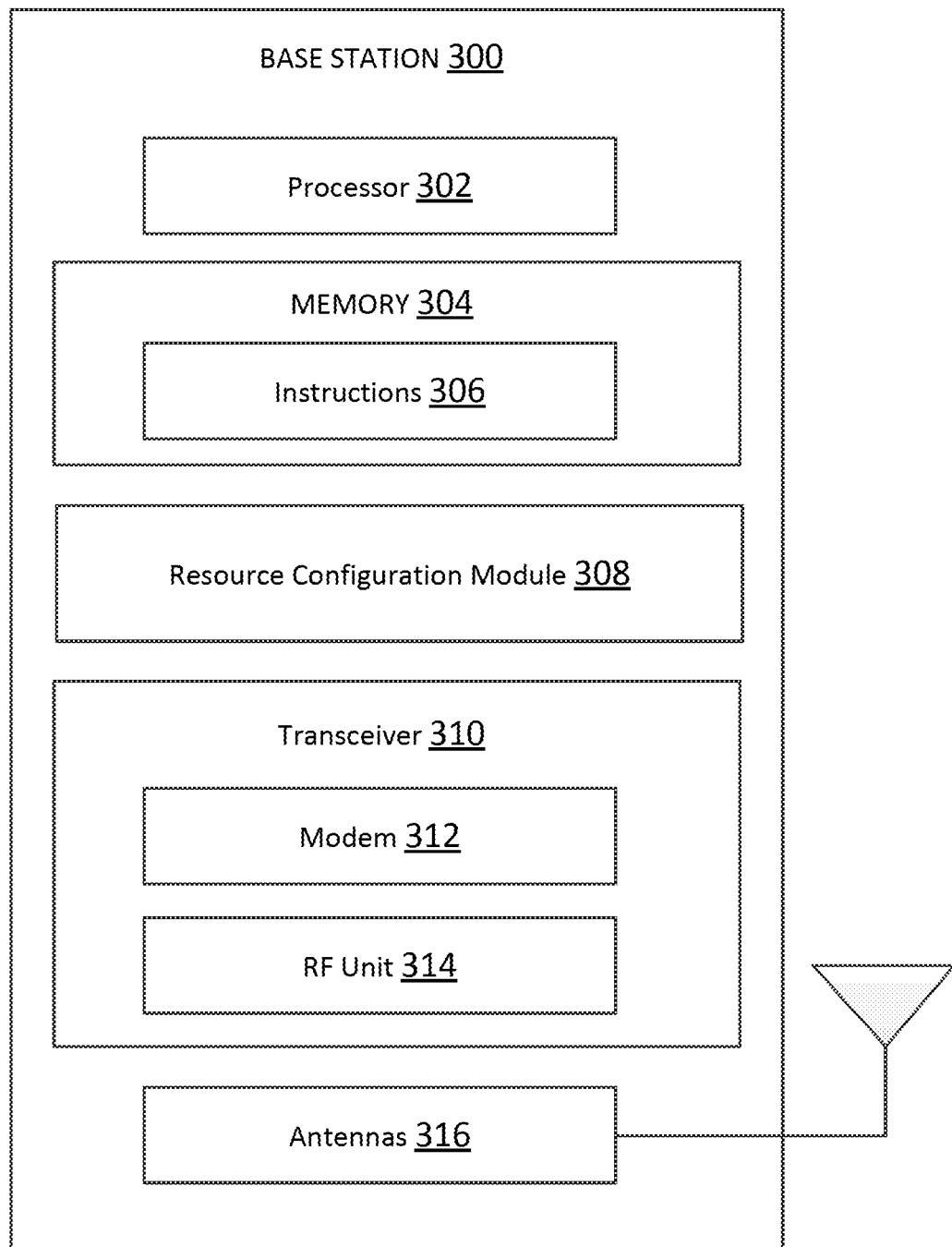
FIG. 3 is a block diagram of an exemplary base station (BS) according to embodiments of the present disclosure.

FIG. 3 is a block diagram of an exemplary BS 300 according to embodiments of the present disclosure. The BS 300 may be a BS 105 as discussed above. A shown, the BS 300 may include a processor 302, a memory 304, a resource configuration module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein. Instructions 306 may also be referred to as code, which may be interpreted broadly to include any type of computer-readable statement(s) as discussed above with respect to FIG. 3.

The resource configuration module 308 may be implemented via hardware, software, or combinations thereof. For example, the resource configuration module 308 may be implemented as a processor, circuit, and/or instructions 306 stored in the memory 304 and executed by the processor 302. The resource configuration module 308 may be used for various aspects of the present disclosure. For example, the resource configuration module 308 is configured to assign resources (e.g., in units of mini-RBs) and a frequency distribution mode of the resources for UEs (e.g., the UEs 115 and 200) to transmit communication signals (e.g., PUSCH signals) based on PSD requirements, number of scheduled UEs, number of scheduled transmission layers per UE, SCSs, determine a reference signal transmission configuration (e.g., time-frequency locations and/or a scrambling code) for each UEs, and/or determine a spreading factor (e.g., in a frequency domain or a time domain) for each UE, as described in greater detail herein.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or 200. The RF unit 314 may be further configured to perform analog beamforming in conjunction with the digital beamforming. Although shown as integrated together in transceiver 310, the modem subsystem 312 and the RF unit 314 may be separate devices that are coupled together at the BS 105 to enable the BS 105 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of information to complete attachment to a network and communication with a camped UE 115 or 200 according to embodiments of the present disclosure. The antennas 316 may further receive data messages transmitted from other devices and provide the received data messages for processing and/or demodulation at the transceiver 310. The antennas 316 may include multiple antennas of similar or different designs in order to sustain multiple transmission links.

Figure 4:
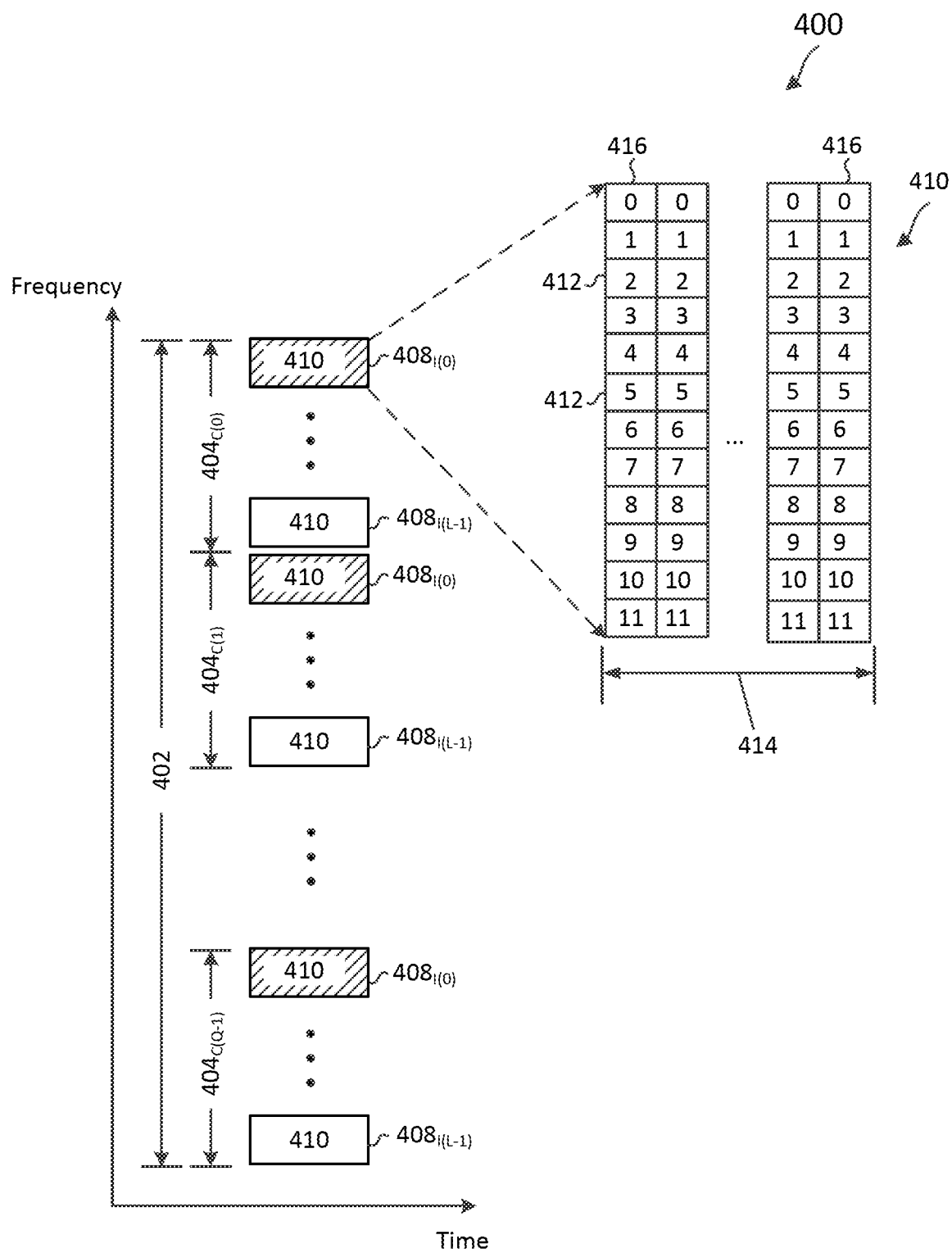
FIG. 4 illustrates a resource configuration scheme using frequency interlaces according to embodiments of the present disclosure.

FIG. 4 illustrates a resource configuration scheme 400 with frequency interlaces according to embodiments of the present disclosure. The scheme 400 may be employed by BSs such as the BSs 105 and 300 and UEs such as the UEs 115 and 200 to communicate over a frequency spectrum 402. In an embodiment, the frequency spectrum 402 may be an unlicensed spectrum. The frequency spectrum 402 may have any suitable bandwidth. In some embodiments, the frequency spectrum 402 may have a bandwidth of about 20 MHz and an SCS of about 30 kHz or about 60 kHz. The frequency spectrum 402 may be located at any suitable frequencies. In some embodiments, the frequency spectrum 402 may be located at about 3.5 GHz, 4 GHz, or 60 GHz. The scheme 400 allocates resources in units of frequency interlaces 408.

The frequency interlaces are shown as $408_{I(0)}$ to $408_{I(L-1)}$, where L is a positive integer. Each frequency interlace 408 may include Q plurality of RBs 410 evenly spaced over the frequency spectrum 402, where Q is a positive integer. In other words, the RBs 410 in a particular frequency interlace $408_{I(i)}$ are spaced apart from each other by at least one other RB 410, where i may vary between 0 and L−1. The values of Q and L may vary based on several factors, such as the bandwidth, the SCS, and/or the PSD limitation of the frequency spectrum 402, as described in greater detail herein. In an embodiment, a BS may assign the frequency interlace $408_{I(0)}$ to one UE and assign the frequency interlace $408_{I(1)}$ to another UE. As an example, an allocation using the frequency interlace $408_{I(0)}$ are shown as pattern filled boxes.

A group of L localized RBs 410 forms a cluster 404. As shown, the frequency interlaces $408_{I(0)}$ to $408_{I(L-1)}$ form N clusters $404_{C(0)}$ to $404_{C(Q-1)}$. Each RB 410 may span about twelve contiguous subcarriers 412 in frequency and a time period 414. The subcarriers 412 are indexed from 0 to 11. The time period 414 may span any suitable number of OFDM symbols 416. In some embodiments, the time period 414 may correspond to one transmission time interval (TTI), which may include about fourteen OFDM symbols 416.

The number of clusters 404 or the value of Q may be dependent on the amount of frequency distribution required to maintain a certain PSD level. In an embodiment, the frequency spectrum 402 may have a bandwidth of about 20 MHz and each subcarrier 412 may span about 30 kHz in frequency. The scheme 400 may divide the frequency spectrum 402 into about ten clusters 404 (e.g., Q=10) with a maximum of five frequency interlaces 408 (e.g., L=5) and distribute an allocation over the ten clusters 404 to increase a frequency occupancy of the allocation. For example, an allocation may include one frequency interlace 408 having ten distributed or equally spaced RBs 410. Compared to an allocation with a single RB or ten localized RBs, the interlaced allocation with the ten distributed RBs 410 allows a UE to transmit at a higher power while maintaining the same PSD level.

In another embodiment, the frequency spectrum 402 may have a bandwidth of about 20 MHz and each subcarrier 412 may span about 60 kHz in frequency. The scheme 400 may divide the frequency spectrum 402 into about five clusters 404 (e.g., Q=5) with a maximum of five frequency interlaces 408 (e.g., L=5). Similarly, an allocation may include one frequency interlace 408 having five distributed RBs 410. The interlaced allocation with the five distributed RBs may allow for better power utilization than an allocation with a single RB or five localized RBs at the same PSD level.

The use of frequency interlacing to distribute an allocation into a wider bandwidth allows a transmitter to transmit at a higher power level than when an allocation occupies contiguous frequencies. As an example, the frequency spectrum 402 may have a maximum allowable PSD level of about 13 decibel-milliwatts per megahertz (dBm/MHz) and a transmitter (e.g., the UEs 115 and 200) may have a power amplifier (PA) capable of transmitting at about 23 dBm. Distributing frequency occupancy of an allocation into five clusters 404 may allow the transmitter to transmit at about 20 dBm (e.g., with a power boost of about 7 dB) while maintaining a PSD level of about 13 dBm/MHz. Distributing frequency occupancy of an allocation into ten clusters 404 may allow the transmitter to transmit at a full power of about 23 dBm (e.g., with a power boost of about 10 dB) while maintaining a PSD level of about 13 dBm/MHz. Thus, the use of frequency interlacing can provide better power utilization.

In an embodiment, the scheme 400 may be applied to a PUSCH to provide a power boost at a UE's transmitter. A PUSCH is used to RRC signaling messages, uplink control information (UCI), and application data in an UL direction from a UE to a BS. For example, a BS may assign a UE to transmit a PUSCH signal using one frequency interlace 408 during a normal operation phase after the UE completed an initial network access. A PUSCH signal may have an OFDM waveform or an SC-FDM waveform.

While the scheme 400 may improve transmit power utilization at the UEs, the number of UEs that can be scheduled or multiplexed in the time period 414 may be reduced since each allocation includes a minimum of one frequency interlace 408.

FIGS. 5-8 illustrate various resource configuration mechanisms that can allow a greater number of UEs to be scheduled or multiplexed within a scheduling period (e.g., the time period 414). For example, resource allocations may be performed at a finer granularity than at a frequency interlace level. In FIGS. 5-8, the x-axes represent time in some constant units, and the y-axes represent frequency in some constant units.

Figure 5:
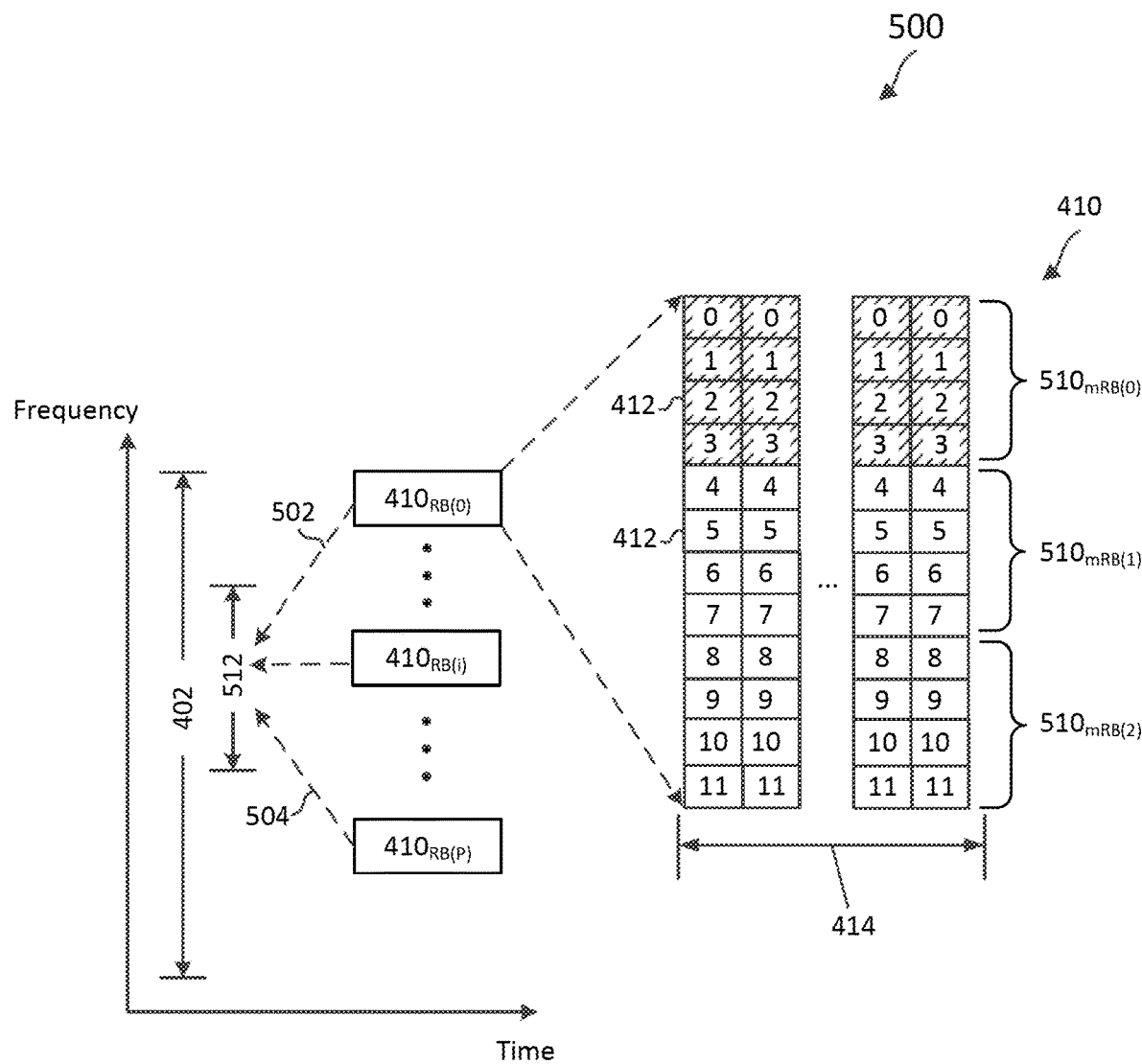
FIG. 5 illustrates a resource configuration scheme using mini-resource block (mini-RBs) according to embodiments of the present disclosure.

FIG. 5 illustrates a resource configuration scheme 500 using mini-RBs according to embodiments of the present disclosure. The scheme 500 may be employed by BSs such as the BSs 105 and 300 and UEs such as the UEs 115 and 200 to communicate over the frequency spectrum 402. To increase the number of UEs that can be scheduled or multiplexed within the time period 414, the scheme 500 divides each RB 410 into N number of mini-RBs 510 and allocates resources in units of mini-RBs 510, where N is a positive integer. As shown, the frequency spectrum 402 includes a plurality of RBs 410 and each RB 410 is divided into three mini-RBs 510 (e.g., N=3) indexed from 0 to 2. Each mini-RB 510 includes a subset of four contiguous subcarriers 412 within the RB 410. The number of mini-RBs 510 within a RB 410 may be preconfigured or determined at the time of scheduling, as described in greater detail herein.

As an example, an allocation with a frequency spreading over K number of RBs 410 satisfies a PSD parameter of the frequency spectrum 402, where K is a positive integer. In the scheme 500, an allocation 512 may include a set of mini-RBs 510 located within M number of distributed RBs 410, where M is a positive integer greater than or equal to K. For example, the allocation 512 may include the mini-RB $510_{mRB(0)}$ located in each of the M RBs 410. The mini-RB $510_{mRB(0)}$ in the allocation 512 are shown as pattern filled boxes. The arrow 502 indicates a first RB (e.g., the RB $410_{RB(0)}$) of the M RBs 410 forming the allocation 512. The arrow 504 indicates an $M^{th}$ RB (e.g., the RB $410_{RB(P)}$, where P is a positive integer) of the M of RBs 410 forming the allocation 512. The allocation 512 may include one or more RBs 410 between the RB $410_{RB(0)}$ and RB $410_{RB(P)}$, shown as RB $410_{RB(i)}$, where i is a positive integer between 0 and P.

In an embodiment, the M distributed RBs 410 in the allocation 512 may be evenly spaced over the frequency spectrum 402. In such an embodiment, the allocation 512 may be used for transmitting an OFDM signal or an SC-FDM signal.

In an embodiment, the M distributed RBs 410 in the allocation 512 may be distributed over the frequency spectrum 402 spaced apart from each other by any suitable number of RBs 410. For example, the M distributed RBs 410 may be unevenly spaced over the frequency spectrum 402. In such an embodiment, the allocation 512 may be used for transmitting an OFDM signal.

In an embodiment, the assignment for the allocation 512 may indicate the M RBs 410 and the particular mini-RB 510 within each of the M RBs 410. For example, an N-bit bitmap may be used to indicate the assignment of the mini-RBs 510, where each bit in the bitmap may correspond to one of the mini-RBs 510 in a RB 410. A particular mini-RB 510 within a RB 410 may be indicated by setting a corresponding bit value to 1. Alternatively, the assignment may use a reduced-form, a compressed-form of the N-bit bitmap, or any other suitable format. As an example, a UE may receive a PUSCH allocation indicating M RBs 410 and a bitmap indicating the particular mini-RB 510 assigned within each of the M RBs 410 for the PUSCH allocation. As can be seen, the scheme 500 employs a finer allocation granularity (e.g., at a mini-RB level) to allow a greater number of UEs to be scheduled over a set of resources.

Figure 6:
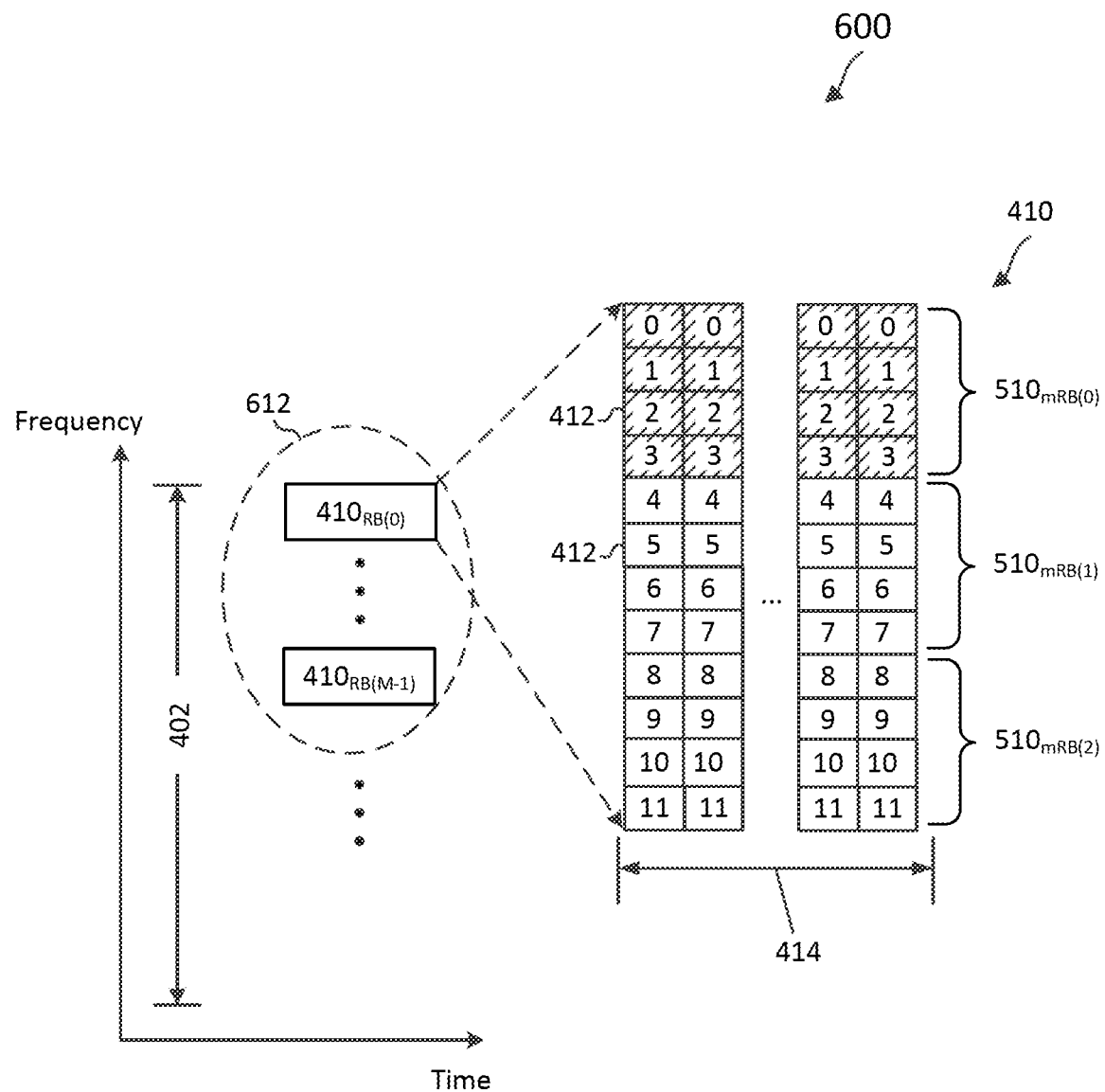
FIG. 6 illustrates a resource configuration scheme using mini-RBs according to embodiments of the present disclosure.

FIG. 6 illustrates a resource configuration scheme 600 using mini-RBs according to embodiments of the present disclosure. The scheme 600 may be employed by BSs such as the BSs 105 and 300 and UEs such as the UEs 115 and 200 to communicate over a frequency spectrum 402. The scheme 600 may be employed when the SCS in the frequency spectrum 402 is sufficiently large. For example, the frequency spectrum 402 may have an SCS of about 60 kHz or greater than 60 kHz. When the SCS is sufficiently large, the allowable transmit power for a certain PSD requirement may be less limited. Thus, the scheme 600 may assign each UE with an allocation 612 with mini-RBs 510 located within M contiguous or localized RBs 410 (e.g., the RBs $410_{RB(0)}$ to $410_{RB(M-1)}$) instead of M distributed RBs 410 as in the scheme 500. The allocation 612 may be used for transmitting an OFDM signal or an SC-FDM signal.

Figure 7:
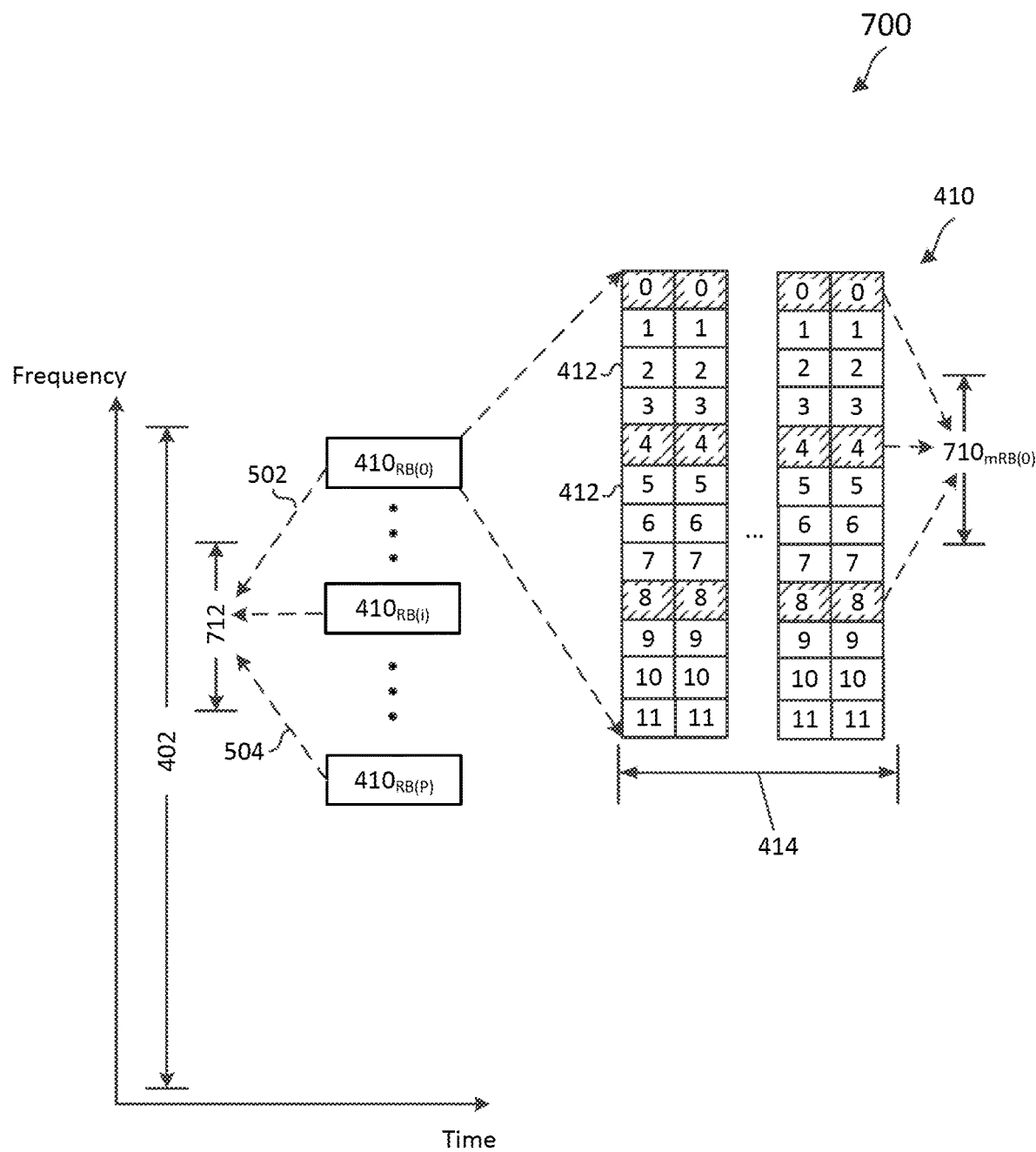
FIG. 7 illustrates a resource configuration scheme using mini-RBs according to embodiments of the present disclosure.

FIG. 7 illustrates a resource configuration scheme 700 using mini-RBs according to embodiments of the present disclosure. The scheme 700 may be employed by BSs such as the BSs 105 and 300 and UEs such as the UEs 115 and 200 to communicate over a frequency spectrum 402. The scheme 700 is substantially similar to the scheme 500, but may allocate mini-RBs 710 formed from distributed subcarriers 412 instead of contiguous subcarriers 412 as in the mini-RBs 510. As an example, in the scheme 700, an allocation 712 may include a mini-RB $710_{mRB(0)}$ formed from subcarriers 412 indexed 0, 4, and 8 of each of the M distributed RBs 410, as shown by the pattern filled boxes. The allocation 712 may be used for transmitting an OFDM signal. When an allocation includes mini-RBs formed from evenly spaced subcarriers 412, for example, indexed 0, 4, and 8 as shown, the allocation may be used for transmitting an OFDM signal or an SC-FDM signal. While the mini-RB 710 is illustrated with evenly spaced subcarriers 412, the mini-RB 710 may be alternatively configured to include unevenly spaced subcarriers 412 within a RB 410.

Figure 8:
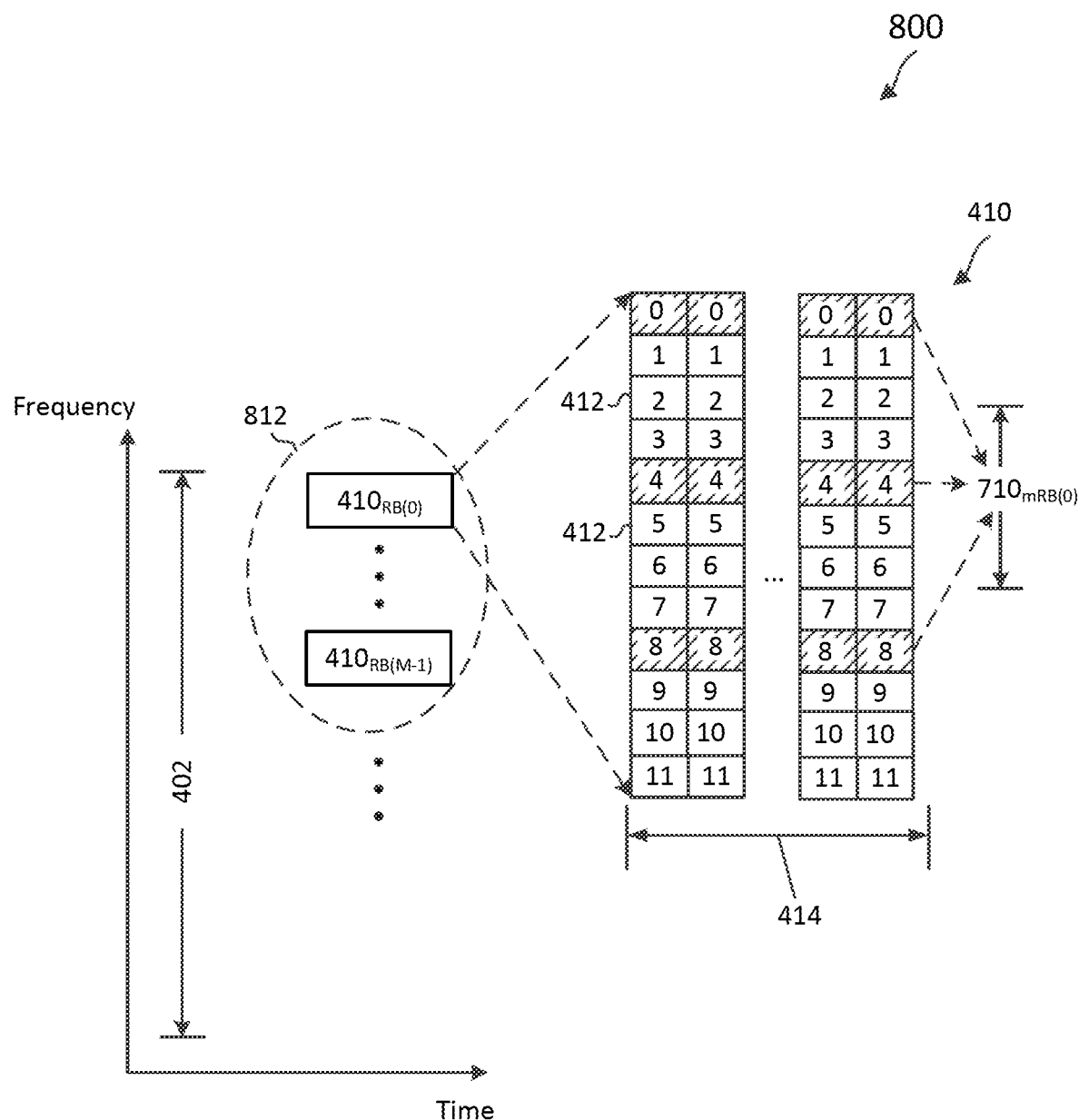
FIG. 8 illustrates a resource configuration scheme using mini-RBs according to embodiments of the present disclosure.

FIG. 8 illustrates a resource configuration scheme 800 using mini-RBs according to embodiments of the present disclosure. The scheme 800 may be employed by BSs such as the BSs 105 and 300 and UEs such as the UEs 115 and 200 to communicate over a frequency spectrum 402. The scheme 800 is substantially similar to the scheme 600, but may allocate mini-RBs 710 formed from distributed subcarriers 412 instead of contiguous subcarriers 412 as in the mini-RBs 510. As an example, in the scheme 800, an allocation 812 may include a mini-RB $710_{mRB(0)}$ formed from subcarriers 412 indexed 0, 4, and 8 of each of the M contiguous RBs 410, as shown by the pattern filled boxes. The allocation 812 may be used for transmitting an OFDM signal or an SC-FDM signal.

To further multiplex or schedule a greater number of UEs (e.g., the UEs 115 and 200) within a scheduling period (e.g., the time period 414), a BS (e.g., the BSs 105 and 300) may communicate with a set of UEs using multi-user multiple-input multiple-output (MU-MIMO). For example, a BS may schedule a set of UEs on the same resources (e.g., a set of mini-RBs $510_{mRB(i)}$ or $710_{mRB(i)}$. In some instances, a BS may schedule different UEs for different transmission layers or antenna ports. To enable channel equalization and demodulation at the BS, the UEs may transmit transmission layer-specific or port-specific reference signals (e.g., DMRSs) in corresponding transmission layers. FIGS. 9-12 illustrate various reference signal structures for use with allocations (e.g., the allocations 512, 612, 712, and 812) having mini-RBs (e.g., the mini-RBs 510 and 710). In FIGS. 9-12, the x-axes represent time in units of symbols, and the y-axes represent frequency in units of subcarriers.

Figure 9:
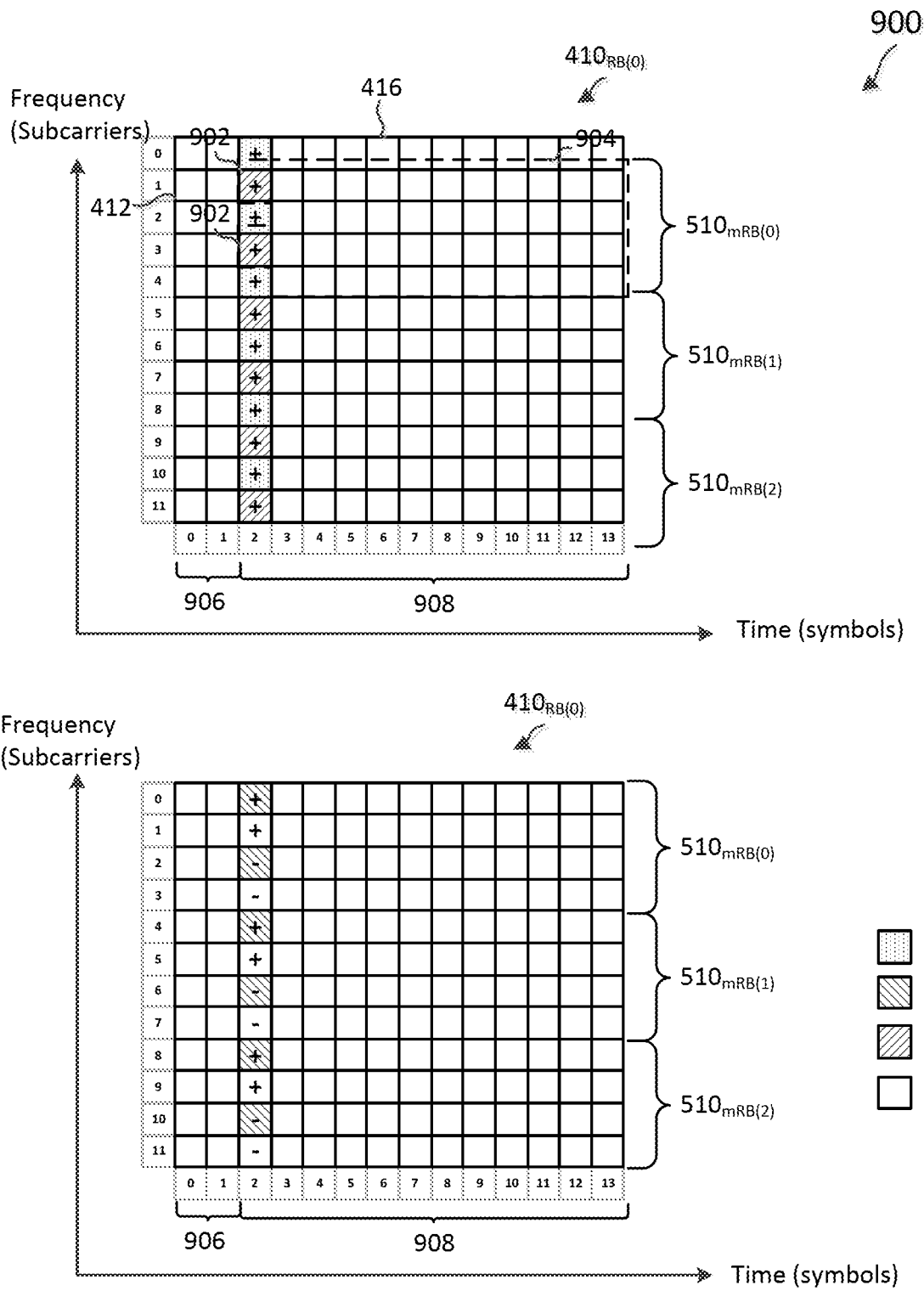
FIG. 9 illustrates a reference signal transmission scheme with mini-RB allocations according to embodiments of the present disclosure.

FIG. 9 illustrates a reference signal configuration scheme 900 with mini-RB allocations according to embodiments of the present disclosure. The scheme 900 may be employed by BSs such as the BSs 105 and 300 and UEs such as the UEs 115 and 200 to communicate over a frequency spectrum 402. The RB 410$_{RB(0)}$ is shown as a time-frequency resource grids spanning twelve subcarriers 412 in frequency and fourteen symbols 416 in time. The twelve subcarriers 412 are indexed from 0 to 11. The symbols 416 are indexed from 0 to 13. The first two symbols 416 (e.g., indexed 0 and 1) may be referred to as a control region 906 reserved for control information transmission from a BS. The remaining symbols 416 (e.g., indexed 2 to 13) may be referred to as a data region 908 where data transmissions may be scheduled. The scheme 900 may designate one symbol 416 (e.g., indexed 2) in the data region 908 for a reference signal transmission.

The scheme 900 illustrates multiplexing of four port-specific reference signals 910 in a RB 410$_{RB(0)}$ over the symbol 416 indexed 3. For example, the reference signals 910a, 910b, 910c, and 910d correspond to antenna ports 0, 1, 2, and 3, respectively. Each reference signal 910 may include a predetermined sequence such as a Zadoff-Chu sequence. Reference signals 910 that are mapped to the same resources may be scrambled with orthogonal codes to enable a receiver to detect and distinguish the different reference signals 910 received from the same resources.

As shown, the reference signals 910a (e.g., on port 0) and 910b (e.g., on port 1) are mapped onto the same subcarriers 412 indexed 0, 2, 4, 6, 8, and 10. The reference signal 910a is scrambled with a first code, denoted as [+, +, +, +, +, +]. The reference signal 910b is scrambled with a second code, denoted as [+, −, +, −+, −], orthogonal to the first code. Similarly, the reference signals 910c (e.g., port 2) and 910d (e.g., port 3) are mapped onto the same subcarriers 412 indexed 1, 3, 5, 7, 9, and 11. The reference signal 910c is scrambled with the first code and the reference signal 910d is scrambled with second code.

The reference signal structure shown in FIG. 9 may correspond to a one-symbol reference signal structure used in a licensed band (e.g., an NR band). In an embodiment, a BS may schedule a UE to transmit using antenna port 0 during a mini-RB 510$_{mRB(0)}$ with contiguous subcarriers 412. The UE may reuse the one-symbol reference signal structure for reference signal transmission. For example, the UE may transmit a reference signal during the symbol 416 indexed 2 using the subcarriers 412 indexed 0 and 2 corresponding to a portion of the reference signal 910a as shown by the dashed boxes 902. The UE may transmit a communication signal (e.g., a PUSCH signal) during the symbols indexed 3 to 13 using the subcarriers 412 indexed 0 to 3 in the mini-RB 510$_{mRB(0)}$, as shown by the dashed box 904.

In an embodiment, different scrambling codes may be applied to reference signals in different mini-RBs 510, for example, based on a frequency location of a mini-RB 510. In some instances, the scrambling code for a mini-RB 510 may be defined as a function of a mini-RB offset or index. For example, the mini-RB 510$_{mRB(1)}$ may have an offset or index of 1.

Figure 10:
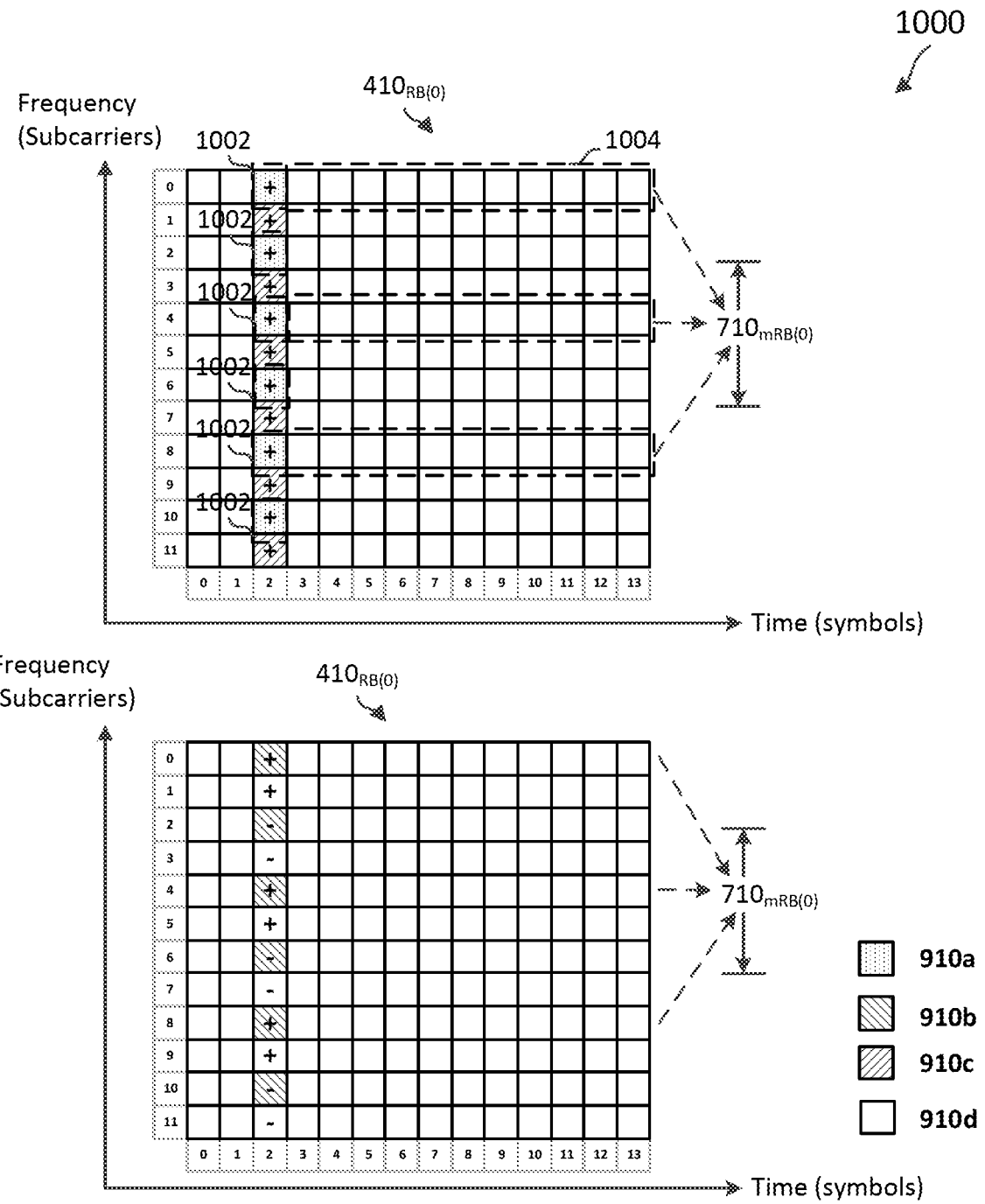
FIG. 10 illustrates a reference signal transmission scheme with mini-RB allocations according to embodiments of the present disclosure.

FIG. 10 illustrates a reference signal configuration scheme 1000 with mini-RB allocations according to embodiments of the present disclosure. The scheme 1000 may be employed by BSs such as the BSs 105 and 300 and UEs such as the UEs 115 and 200 to communicate over a frequency spectrum 402. The scheme 1000 is substantially similar to the scheme 900, but illustrates reference signal transmissions with a mini-RB 710 having distributed subcarriers 412. For example, a BS may schedule a UE to transmit using antenna port 0 during a mini-RB 710$_{mRB(0)}$. Similarly, the UE may reuse the one-symbol reference signal structure for reference signal transmission.

For example, the UE may transmit a reference signal during the symbol 416 indexed 2 using the subcarriers 412 indexed 0, 2, 4, 6, and 8 corresponding to the reference signal 910a as shown by the dashed boxes 1002. The UE may transmit a communication signal (e.g., a PUSCH signal) during the symbols indexed 3 to 13 using the subcarriers 412 indexed 0, 4, and 8 in the mini-RB 710$_{mRB(0)}$ as shown by the dashed box 1004. In other words, the UE may transmit a reference signal using a greater bandwidth than the assigned mini-RB 710$_{mRB(0)}$, where the reference signal may be mapped to subcarriers 412 outside the min-RB 710$_{mRB(0)}$. In an embodiment, different UEs may use different scrambling codes for reference signal transmissions. In an embodiment, different UEs transmitting on frequency-division multiplexed (FDM) reference signal ports may use different scrambling code.

Figure 11:
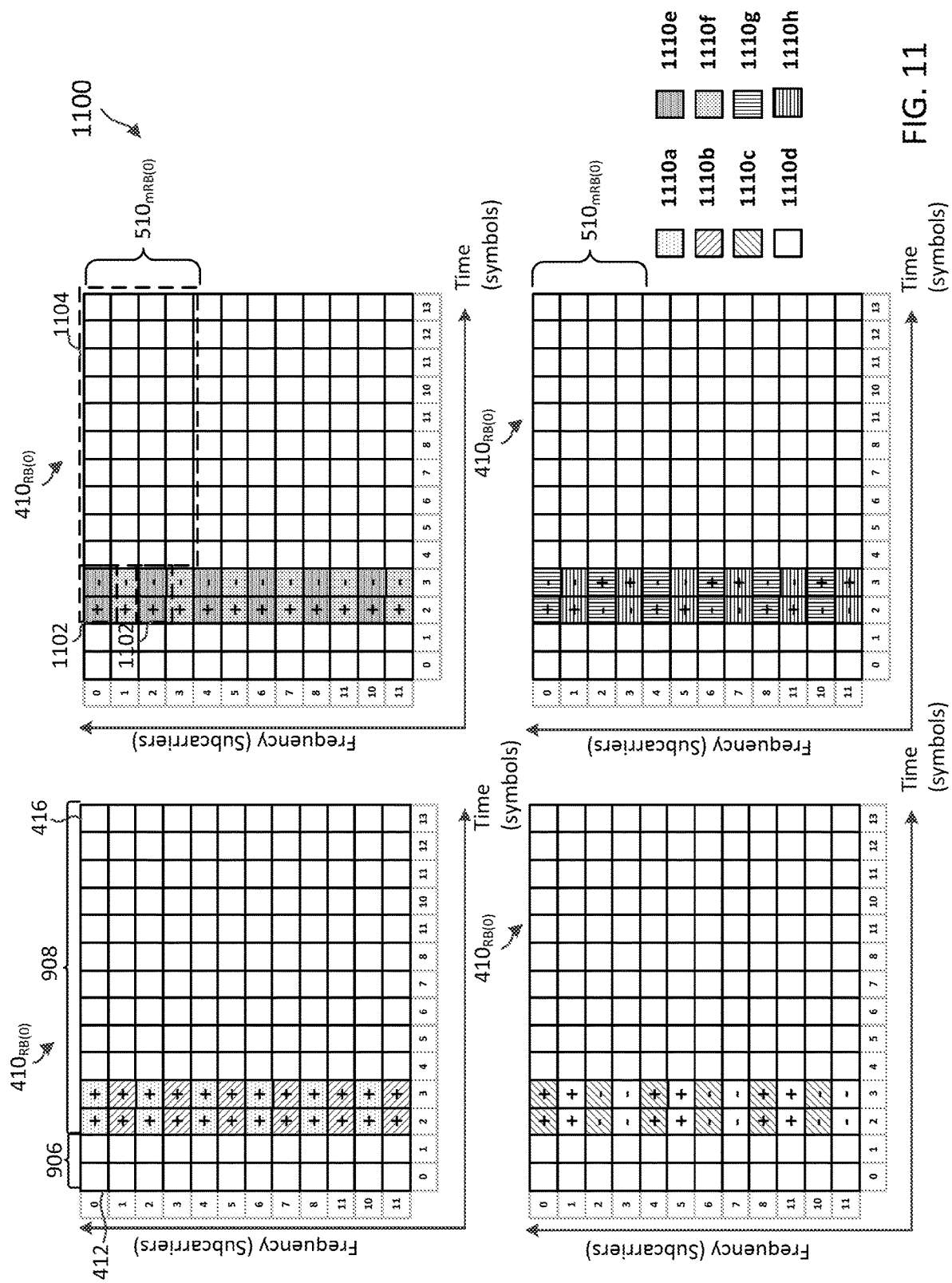
FIG. 11 illustrates a reference signal transmission scheme with mini-RB allocations according to embodiments of the present disclosure.

FIG. 11 illustrates a reference signal configuration scheme 1100 with mini-RB allocations according to embodiments of the present disclosure. The scheme 1100 may be employed by BSs such as the BSs 105 and 300 and UEs such as the UEs 115 and 200 to communicate over a frequency spectrum 402. The scheme 1100 is substantially similar to the scheme 900, but designates two symbols 416 from the data region 908 for reference signal transmissions. The scheme 1100 illustrates the multiplexing of eight reference signals 1110 in a RB 410$_{RB(0)}$ over two symbols 416 (e.g., indexed 2 and 3). Each reference signal 1110 may correspond to a particular antenna port. For example, the reference signals 1110a, 1110b, 1110c, 1110d, 1110e, 1110f, 1110g, and 1110h correspond to antenna ports 0, 1, 2, 3, 4, 5, 6, and 7, respectively. Each reference signal 1110 may include a predetermined sequence. Reference signals 1110 that are mapped to the same resources may be scrambled with orthogonal codes to enable a receiver to detect and distinguish the different signals 1110 from the same resources.

As shown, the reference signals 1110a (e.g., on port 0), 1110c (e.g., on port 2), 1110e (e.g., on port 4), and 1110g (e.g., on port 6) are mapped to the same subcarriers 412 indexed 0, 2, 4, 6, 8, and 10. The reference signal 1110a is scrambled with a first code, denoted as {[+, +, +, +, +, +] [+, +, +, +, +, +]}. The reference signal 1110c is scrambled with a second code {[+, +, +, +, +, +] [−, −, −, −, −, −]}. The reference signal 1110e is scrambled with a third code {[+, −, +, −, +, −] [+, −, +, −, +, −]}. The reference signal 1110g is scrambled with a fourth code {[+, −, +, −, +, −] [−, +, −, +, −, +]}. The first, second, third, and fourth codes are orthogonal to each other. Similarly, the reference signals 1110b, 1110d, 1110f, and 1110h are mapped to the same subcarriers 412 indexed 1, 3, 5, 7, 9, and 11 and scrambled with the first, second, third, and fourth codes, respectively.

The reference signal structure shown in FIG. 11 may correspond to a two-symbol reference signal structure used in a licensed band (e.g., an NR band). In an embodiment, a BS may schedule a UE to transmit using antenna port 4 during a mini-RB 710$_{mRB(0)}$ with contiguous subcarriers 412. The UE may reuse the two-symbol reference signal structure for reference signal transmission. For example, the UE may transmit a reference signal during the symbols 416 indexed 2 and 3 using the subcarriers 412 indexed 0 and 2 corresponding to a portion of the reference signal 1110e as shown by the dashed boxes 1102. The UE may transmit a communication signal (e.g., a PUSCH signal) during the symbols indexed 4 to 13 using the subcarriers 412 indexed 0 to 3 in the mini-RB 710$_{mRB(0)}$ as shown by the dashed box 1104.

Figure 12:
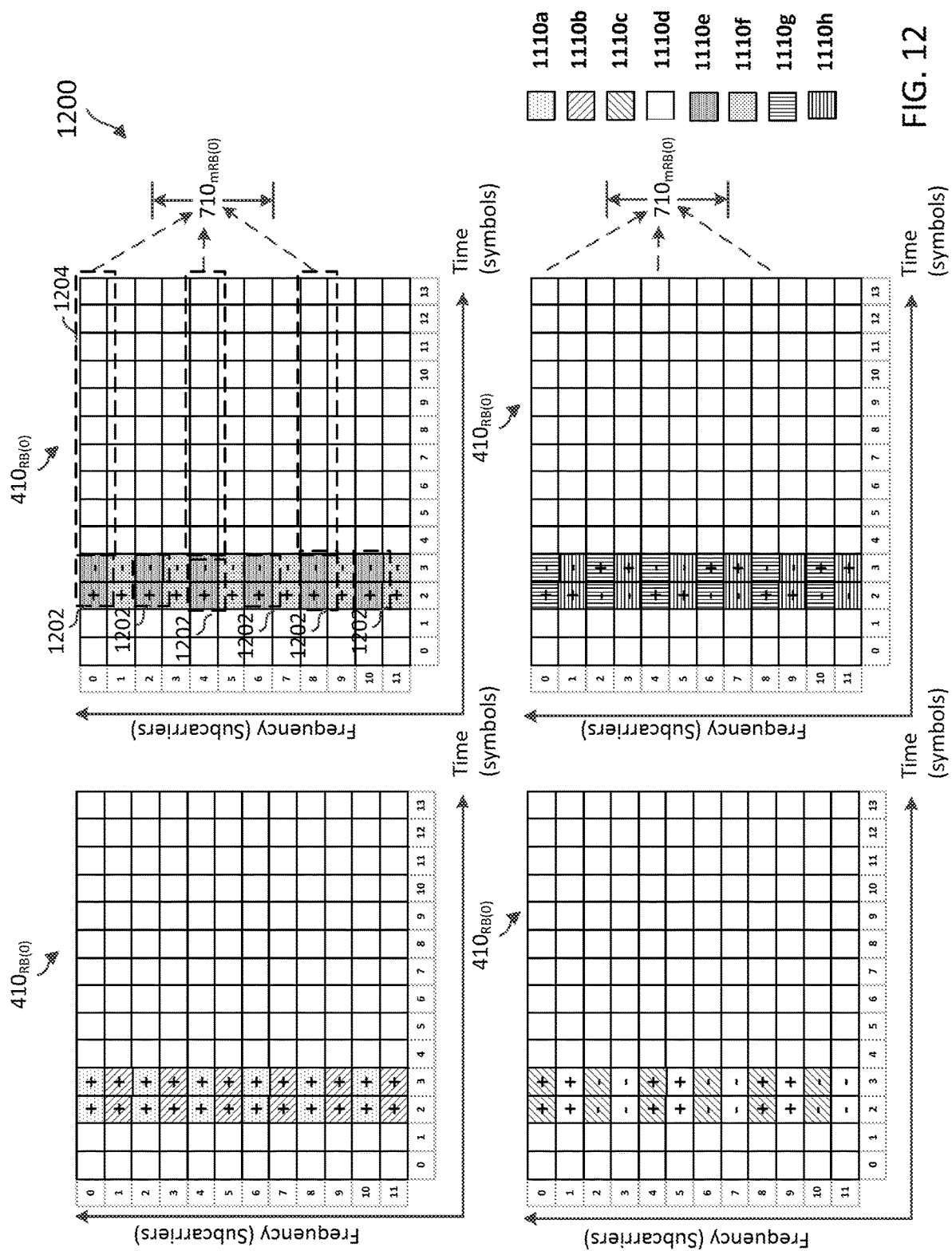
FIG. 12 illustrates a reference signal transmission scheme with mini-RB allocations according to embodiments of the present disclosure.

FIG. 12 illustrates a reference signal configuration scheme 1200 with mini-RB allocations according to embodiments of the present disclosure. The scheme 1200 may be employed by BSs such as the BSs 105 and 300 and UEs such as the UEs 115 and 200 to communicate over a frequency spectrum 402. The scheme 1200 is substantially similar to the scheme 1100, but illustrates reference signal transmissions with mini-RB 710 having distributed subcarriers 412. For example, a BS may schedule a UE to transmit using antenna port 4 during a mini-RB $710_{mRB(0)}$. Similarly, the UE may reuse the two-symbol reference signal structure for reference signal transmission. For example, the UE may transmit a reference signal during the symbol 416 indexed 2 and 3 using the subcarriers 412 indexed 0, 2, 4, 6, and 8 corresponding to the reference signal 1110e as shown by the dashed boxes 1202. The UE may transmit a communication signal (e.g., a PUSCH signal) during the symbols indexed 4 to 13 using the subcarriers 412 indexed 0, 4, and 8 in the mini-RB $710_{mRB(0)}$ as shown by the dashed box 1204.

While the schemes 900, 1000, 1100, and 1200 are illustrated with reference signal transmissions on one or two symbols, the number of symbols for reference signal transmissions may be increased to improve processing gain. In addition, the reference signals may include any suitable sequences and may be scrambled with any suitable orthogonal codes. Further, while the schemes 900, 1000, 1100, and 1200 map a reference signal of a particular transmission layer or port to even subcarriers 412 or odd subcarriers 412, the reference signals may be configured to include any suitable frequency and/or time distribution patterns.

Figure 13:
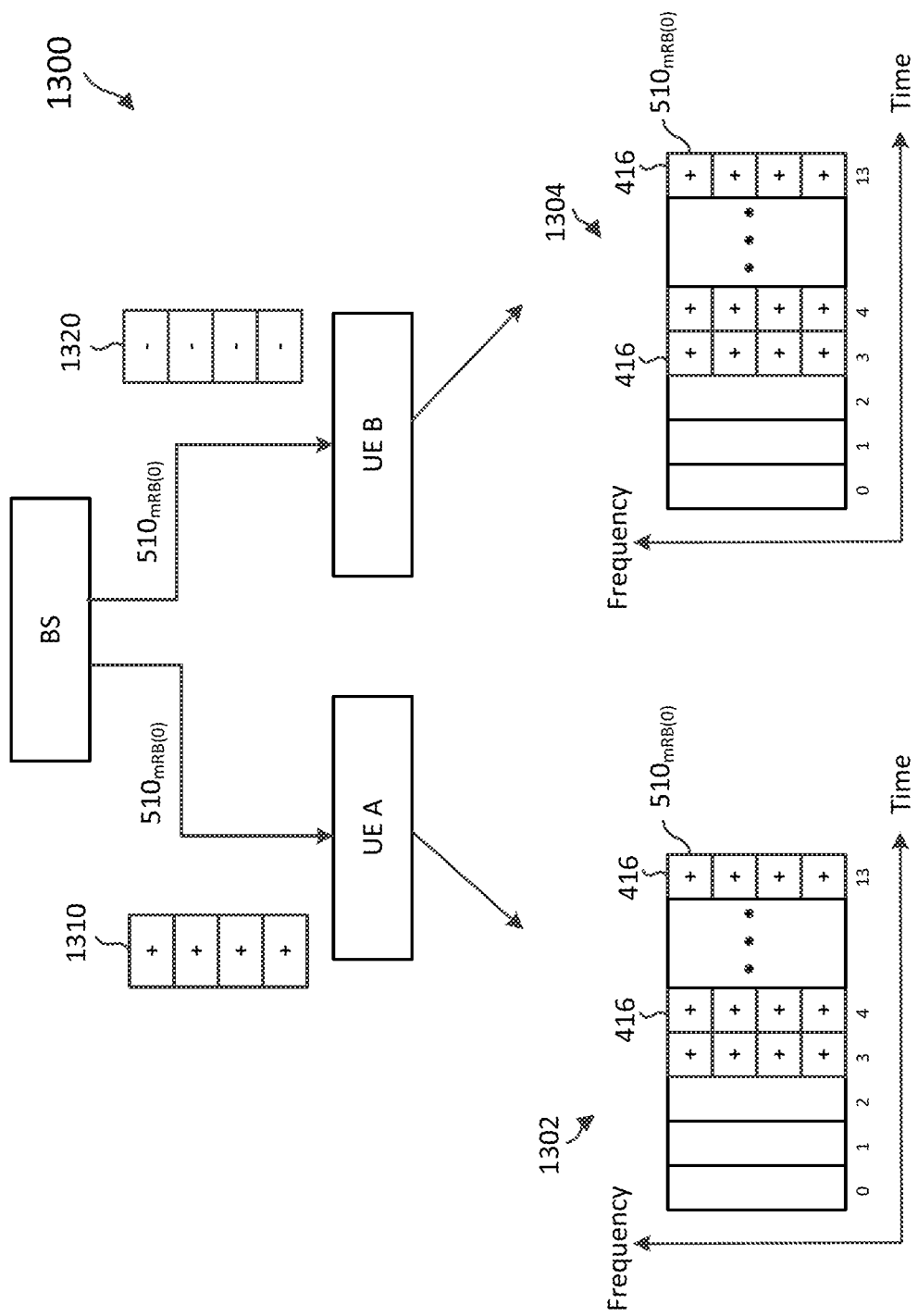
FIG. 13 illustrates a frequency-domain code-division multiplexing (CDM) scheme for transmissions using mini-RBs according to embodiments of the present disclosure.
Figure 14:
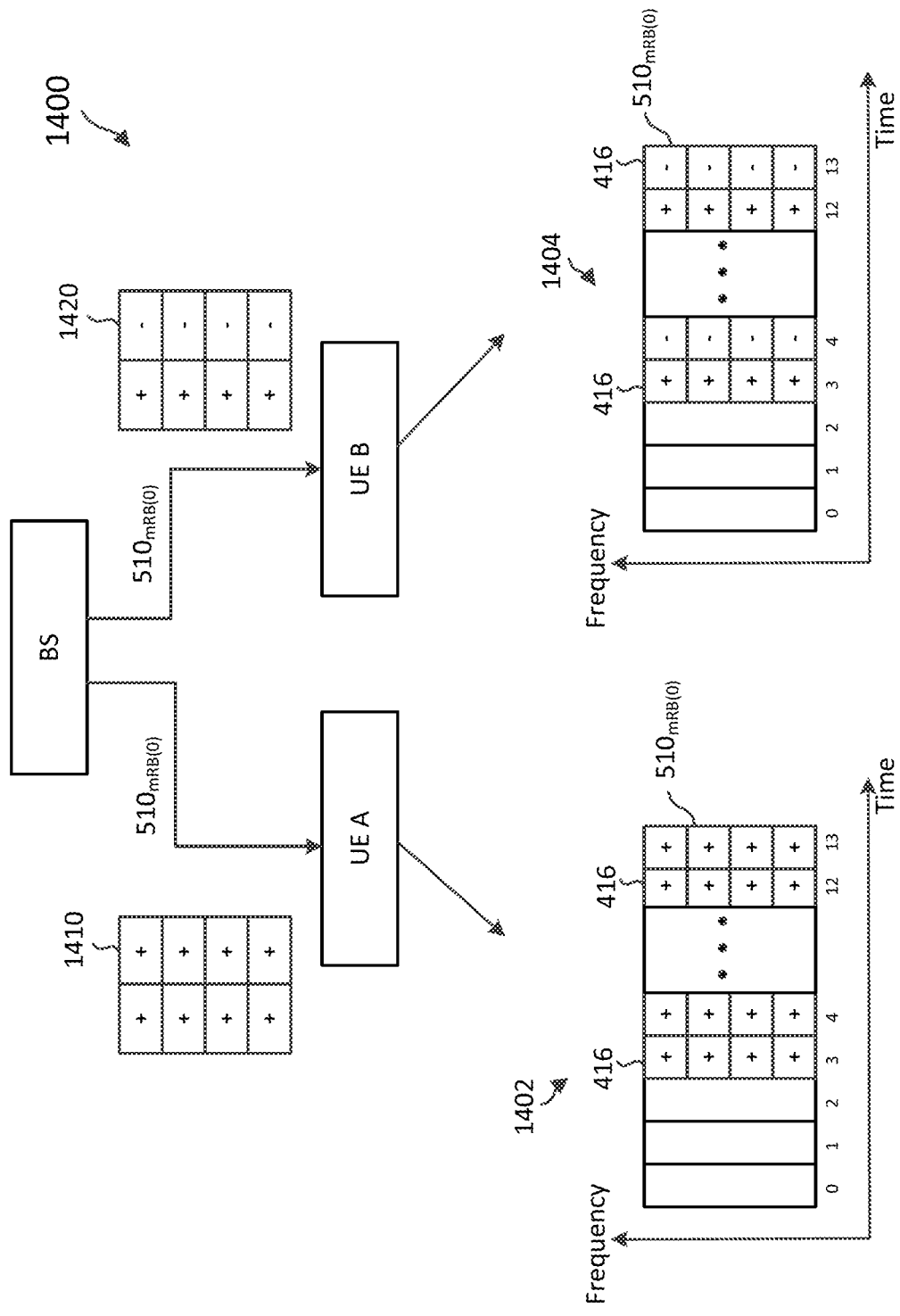
FIG. 14 illustrates a time-domain CDM scheme for transmissions using mini-RBs according to embodiments of the present disclosure.

To further multiplex or schedule a greater number of UEs (e.g., the UEs 115 and 200) within a scheduling period (e.g., the time period 414), a BS (e.g., the BSs 105 and 300) may assign multiple UEs to transmit on the same set of resources (e.g., the mini-RBs 510 and 710), but with different spreading codes or factors in time or in frequency. FIGS. 13 and 14 illustrate various CDM mechanisms for use with allocations (e.g., the allocations 512, 612, 712, and 812) having mini-RBs (e.g., the mini-RBs 510 and 710). In FIGS. 13 and 14, the x-axes represent time in units of symbols, and the y-axes represent frequency in some constant units.

FIG. 13 illustrates a frequency-domain CDM scheme 1300 for transmissions using mini-RBs according to embodiments of the present disclosure. The scheme 1300 may be employed by BSs such as the BSs 105 and 300 and UEs such as the UEs 115 and 200 to communicate over a frequency spectrum 402. For example, a BS may schedule multiple UEs to transmit on the same resources, but with different spreading factors in a frequency domain. As shown, a BS may schedule a UE A and a UE B to transmit on the same mini-RB $510_{mRB(0)}$. The BS may assign the UE A with a spreading factor 1310, denoted as [+, +, +, +]. The BS may assign the UE B with a spreading factor 1320, denoted as [−, −, −, −], that is orthogonal to the spreading factor 1310. Thus, the UE A may generate a communication signal (e.g., a PUSCH signal) for transmission in the mini-RB $510_{mRB(0)}$ by applying the spreading factor 1310 to each symbol 416, for example, indexed 3 to 13, as shown in the view 1302. Similarly, the UE B may generate a communication signal (e.g., a PUSCH signal) for transmission by applying the spreading factor 1320 to each symbol 416, for example, indexed 3 to 13, as shown in the view 1304. The scheme 1300 may be suitable for use with signals including an OFDM waveform or an SC-FDM waveform. While the scheme 1300 is illustrated with mini-RB-based allocations (e.g., including mini-RBs 510 or 710), the scheme 1300 may be suitable for use with RB-based allocations (e.g., including RBs 410).

FIG. 14 illustrates a time-domain CDM scheme 1400 for transmissions using mini-RBs according to embodiments of the present disclosure. The scheme 1400 may be employed by BSs such as the BSs 105 and 300 and UEs such as the UEs 115 and 200 to communicate over a frequency spectrum 402. For example, a BS may schedule multiple UEs to transmit on the same resources, but with different spreading factors in a time domain. As shown, a BS may schedule a UE A and a UE B to transmit on the same mini-RB $510_{mRB(0)}$. The BS may assign the UE A with a spreading factor 1410, denoted as {[+, +, +, +] [+, +, +, +]}. The BS may assign the UE B with a spreading factor 1420, denoted as {[[+, +, +, +] [−, −, −, −]} that is orthogonal to the spreading factor 1410. Thus, the UE A may generate a communication signal (e.g., a PUSCH signal) for transmission in the mini-RB $510_{mRB(0)}$ by applying the spreading factor 1410 to each pair of adjacent symbols 416, for example, indexed 3 to 13, as shown in the view 1402. Similarly, UE B may generate a communication signal (e.g., a PUSCH signal) for transmission in the mini-RB $510_{mRB(0)}$ by applying the spreading factor 1420 to each pair of adjacent symbols 416, for example, indexed 3 to 13, as shown in the view 1404. The scheme 1400 may be applied to PUSCH signals with an OFDM waveform.

While the schemes 1300 and 1400 are illustrated with mini-RBs having contiguous subcarriers, similar CDM mechanisms may be applied to mini-RBs having distributed subcarriers such as the mini-RBs 710. In addition, the schemes 1300 and 1400 may be applied to allocations with mini-RBs located within a set of localized RBs or a set of distributed RBs. Further, the schemes 1300 and 1400 may employ any suitable spreading factors for the CDM.

The resource allocation schemes 500, 600, 700, 800 described above with respect to FIGS. 5, 6, 7, and 8, respectively, may be used in conjunction with the reference signal transmission schemes 900, 1000, 1100, 1200 described above with respect to FIGS. 9, 10, 11, and 12, and/or the CDM schemes 1300, and 1400 described above with respect to FIGS. 13, and 14 respectively.

Figure 15:
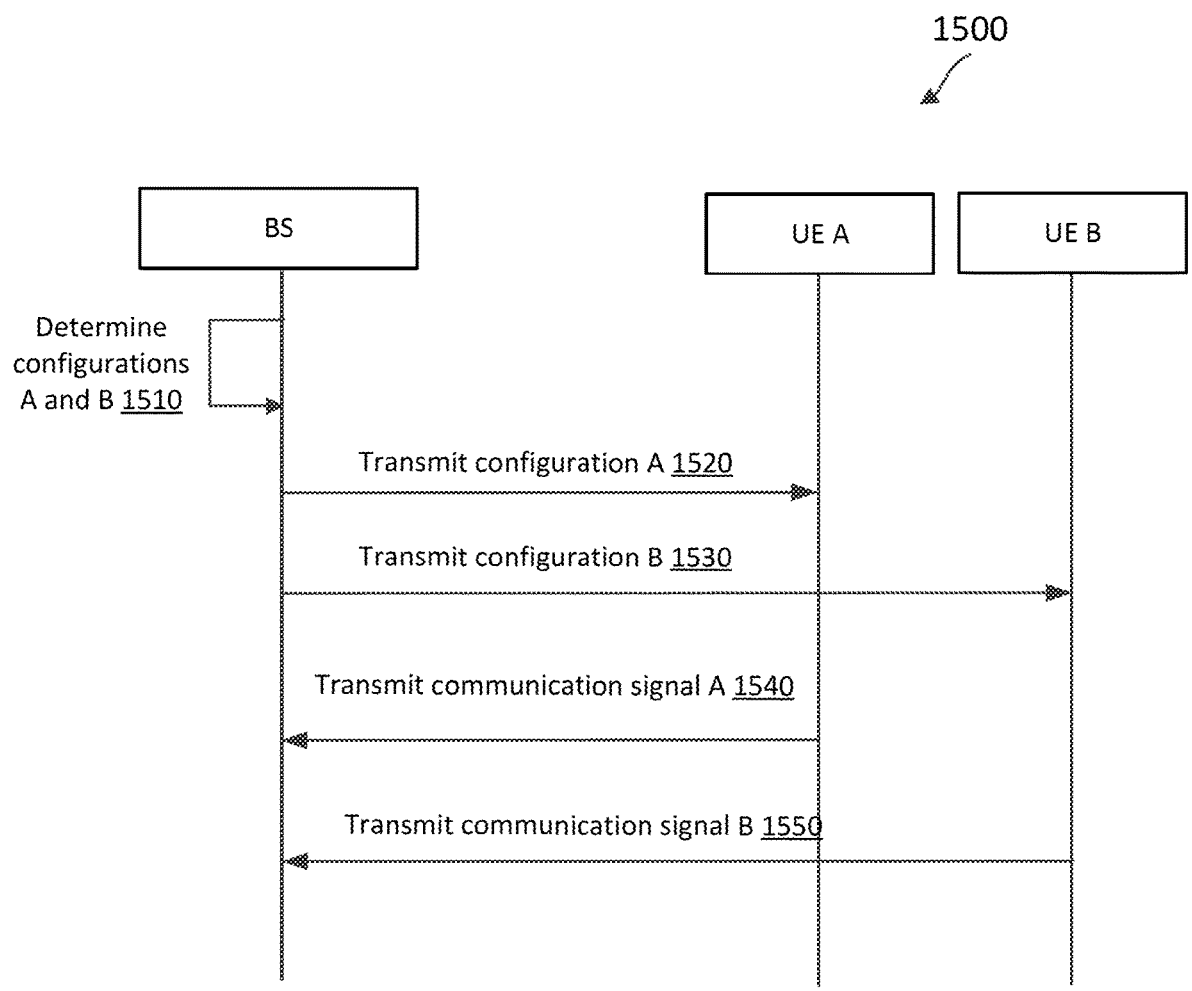
FIG. 15 is a signaling diagram of a communication method using mini-RBs according to embodiments of the present disclosure.

FIG. 15 is a signaling diagram of a communication method 1500 using mini-RBs according to embodiments of the present disclosure. The method 1500 is implemented among a BS, a UE A, and a UE B. The BS may be similar to the BSs 105 and 300. The UEs A and B may be similar to the UEs 115 and 200. Steps of the method 1500 can be executed by computing devices (e.g., a processor, processing circuit, and/or other suitable component) of the BS and the UEs A and B. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1510, the BS determines a configuration A for the UE A and a configuration B for the UE B to transmit in a frequency spectrum (e.g., the frequency spectrum 402) during a scheduling period (e.g., the time period 414). The BS may determine the configuration A and the configuration B based on a number of UEs to be scheduled for communicating in the scheduling period, a number of transmission layers or antenna ports per scheduled UE, a waveform type for the scheduled transmission (e.g., OFDM waveform or SC-FDM waveform), a SCS for the transmissions (e.g., about 30 kHz or about 60 kHz), and/or a PSD requirement of the frequency spectrum. The BS may assign resources to the UE A and the UE B in units of mini-RBs (e.g., the mini-RBs 510 and 710) by employing the schemes 500, 600, 700, or 800 described with respect to FIG. 5, 6, 7, or 8, respectively. For example, the BS may assign the UE A and the UE B on different sets of mini-RBs. Alternatively, the BS may assign the UE A and the UE B on the same set of mini-RBs, but with different spreading factors by employing the schemes 1300 or 1400 described with respect to FIG. 13 or 14, respectively, or on different transmission layers. The BS may assign scrambling codes for the UE A and the UE B to transmit reference signals on the same resources by employing the schemes 900, 1000, 1100, or 1200 described with respect to FIG. 9, 10, 11, or 12, respectively.

At step 1520, the BS transmits the configuration A to the UE A. The configuration A may indicate resources, scrambling codes for reference signal transmissions, and/or spreading factors and/or a waveform type for data transmissions (e.g., PUSCH signals). The resources may be indicated using a bitmap, for example, representing a set of mini-RBs within a set of RBs (e.g., the RBs 410).

At step 1530, the BS transmits the configuration B to the UE B. The configuration B may indicate similar types of information as the configuration A.

At step 1540, the UE A may transmit a communication signal A (e.g., a PUSCH signal) to the BS based on the configuration A.

At step 1550, the UE B may transmit a communication signal B (e.g., a PUSCH signal) to the BS based on the configuration B.

In an embodiment, a transport block size (TBS) for a transmission with a mini-RB-based allocation (e.g., the allocations 512, 612, 712, and 812) may be computed as shown below:

$$TBS = 8 \times \left\lceil \frac{N_{mini\text{-}RB} \times N_{RE}^{mini\text{-}RB} \times v \times Q_m \times R}{8} \right\rceil, \quad (1)$$

where $N_{mini\text{-}RB}$ represents the number of mini-RBs (e.g., the mini-RBs 510 and 710) in the allocation, $N_{RE}^{mini\text{-}RB}$ represents the number of subcarriers (e.g., the subcarriers 412) in each mini-RB, v represents the number of transmission layers, $Q_m$ represents the modulation order, and R represents the coding rate.

In an embodiment, a TBS for a transmission with an RB-based allocation (e.g., including RBs 410) in conjunction with CDM may be computed as shown below:

$$TBS = 8 \times \left\lceil \frac{N_{PRB} \times N_{RE}^{PRB} \times v \times Q_m \times R}{8 \times N} \right\rceil, \quad (2)$$

where $N_{PRB}$ represents the number of RBs (e.g., the RBs 410) in the allocation and $N_{RE}^{PRB}$ represents the number of subcarriers (e.g., the subcarriers 412) in each RB.

In an embodiment, a TBS for a transmission with a mini-RB-based allocation (e.g., the allocations 512, 612, 712, and 812) in conjunction with CDM may be computed as shown below:

$$TBS = 8 \times \left\lceil \frac{N_{mini\text{-}RB} \times N_{RE}^{mini\text{-}RB} \times v \times Q_m \times R}{8 \times N} \right\rceil, \quad (3)$$

where N represents the length of the spreading codes (e.g., the spreading factors 1310, 1320, 1410, and 1420).

Figure 16:
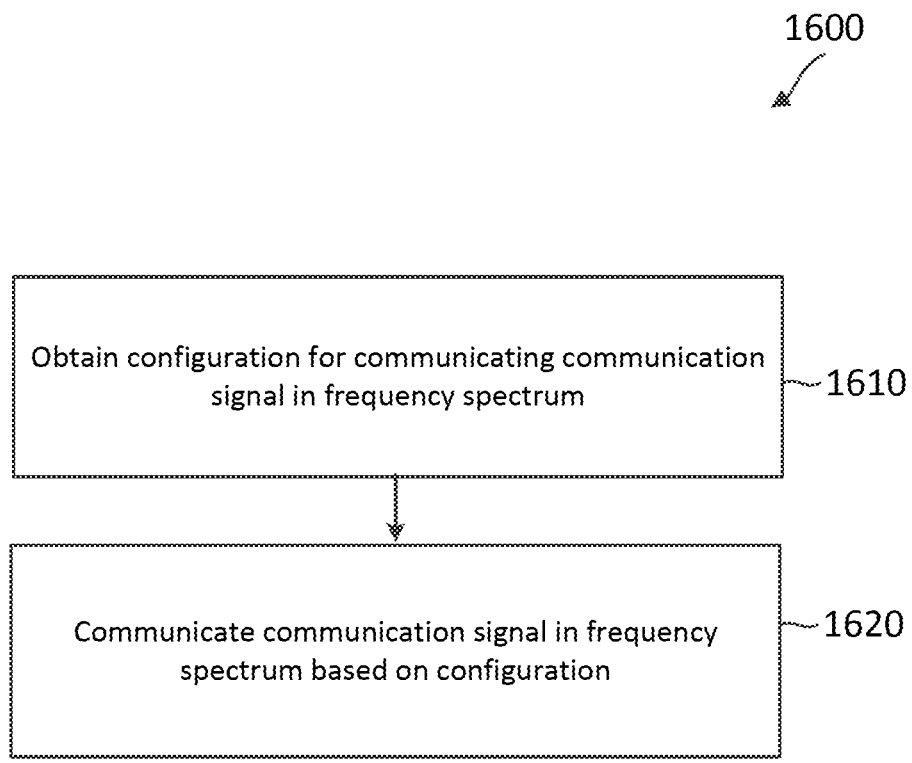
FIG. 16 is a flow diagram of a communication method using mini-RBs according to embodiments of the present disclosure.

FIG. 16 is a flow diagram of a communication method 1600 using mini-RBs according to embodiments of the present disclosure. Steps of the method 1600 can be executed by a computing device (e.g., a processor, processing circuit, and/or other suitable component) of a wireless communication device, such as the BSs 105 and 300 and the UEs 115 and 200. The method 1600 may employ similar mechanisms as in the schemes 500, 600, 700, 800, 900, 000, 1100, 1200, 1300, and 1400 and the method 1500 described with respect to FIGS. 5, 6, 7, 8, 9, 10, 11, 12, 13, 14, and 15, respectively. As illustrated, the method 1600 includes a number of enumerated steps, but embodiments of the method 1600 may include additional steps before, after, and in between the enumerated steps. In some embodiments, one or more of the enumerated steps may be omitted or performed in a different order.

At step 1610, the method 1600 includes obtaining, by a first wireless communication device, a configuration for communicating a communication signal (e.g., a PUSCH signal) in a frequency spectrum (e.g., the frequency spectrum 402). The communication signal may include an OFDM waveform or an SC-FDM waveform. The configuration may be obtained based on at least a number of wireless communication devices scheduled to communicate in a time period (e.g., the time period 414), a number of transmission layers per scheduled wireless communication device. The configuration may indicate resources (e.g., mini-RBs 510 and 710) and a frequency distribution mode of the resources.

For example, the resources are located within K plurality of RBs (e.g., the RBs 410) in the frequency spectrum over the time period, where a frequency spreading over M of the K plurality of RBs satisfies a PSD parameter of the frequency spectrum. K and M are positive integers and K may be greater than or equal to M. In an embodiment, the resources include a set of contiguous subcarriers (e.g., the mini-RBs 510) in each of the K RBs, which may include be contiguous, evenly spaced, or unevenly spaced in the frequency spectrum. In an embodiment, the resources include a set of distributed subcarriers (e.g., the mini-RBs 710) in each of the K RBs, which may be contiguous, evenly spaced, unevenly spaced in the frequency spectrum, and the set of distributed subcarriers are spaced apart from each other by at least one other subcarrier.

At step 1620, the method 1600 includes communicating, by the first wireless communication device with a second wireless communication device, the communication signal in the frequency spectrum during the time period based on the configuration.

In an embodiment, the first wireless communication device may correspond to a BS and the second wireless communication device may correspond to a UE. In such an embodiment, the obtaining may include determining, by the first wireless communication device, the resources and the frequency distribution mode based on a PSD parameter of the frequency spectrum, a waveform (e.g., an OFDM waveform or an SC-FDM waveform) of the communication signal, and/or a SCS (e.g., 30 kHz or 60 kHz) used for communicating with the second wireless communication device. The scheduled wireless communication devices may include the second wireless communication device. The communicating the communication signal may include receiving, by the first wireless communication device from the second wireless communication device, the communication signal. The method 1600 may further include transmitting, by the first wireless communication device to the second wireless communication device, the configuration.

In an embodiment, the first wireless communication device may correspond to a UE and the second wireless communication device may correspond to a BS. In such an embodiment, the obtaining may include receiving, by the first wireless communication device from the second wireless communication device, the configuration. The communicating the communication signal may include transmitting, by the first wireless communication device to the second wireless communication device, the communication signal.

In some embodiments, the method 1600 may further include communicating, by the first wireless communication device with the second wireless communication device, a reference signal (e.g., the reference signals 910 and 1110) during one or more time symbols (e.g., the symbols 416) within the time period. In such embodiments, the communication signal is communicated during one or more other time symbols within the time period, for example, as shown in the schemes 900, 1000, 1100, and 1200. In some embodiments, the reference signal may be communicated using at least one subcarrier outside the resources, for example, as shown in the schemes 1000 and 1200.

In an embodiment, the communicating the communication signal is based on CMD in at least one of a time domain or a frequency domain with another communication signal transmitted by a third wireless communication device using the resources, for example, as shown in the schemes 1300 and 1400.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Further embodiments of the present disclosure include a method of wireless communication, comprising obtaining, by a first wireless communication device, a configuration for communicating a communication signal in a frequency spectrum, wherein the configuration is based on at least a number of wireless communication devices scheduled to communicate in a time period and indicates resources in the frequency spectrum over the time period and a frequency distribution mode of the resources; and communicating, by the first wireless communication device with a second wireless communication device, the communication signal in the frequency spectrum during the time period based on the configuration.

In some embodiments, wherein the obtaining includes determining, by the first wireless communication device, the resources and the frequency distribution mode based on a power spectral density (PSD) parameter of the frequency spectrum, and wherein the scheduled wireless communication devices include the second wireless communication device. In some embodiments, wherein the obtaining includes determining, by the first wireless communication device, the resources and the frequency distribution mode based on at least one of a number of transmission layers scheduled for each of the scheduled wireless communication devices, a waveform of the communication signal, or a subcarrier spacing used for communicating with the second wireless communication device. In some embodiments, wherein the communicating includes communicating a physical uplink shared channel (PUSCH) signal using the resources. In some embodiments, wherein the resources are located within K plurality of resource blocks (RBs) in the frequency spectrum over the time period, wherein a frequency spreading over M of the K plurality of RBs satisfies a power spectral density (PSD) parameter of the frequency spectrum, wherein K and M are positive integers, and wherein K is greater than or equal to M. In some embodiments, wherein the resources include a set of contiguous subcarriers. In some embodiments, wherein the resources include a set of distributed subcarriers spaced apart from each by at least one other subcarrier. In some embodiments, the method further comprises communicating, by the first wireless communication device with the second wireless communication device, a reference signal during one or more time symbols within the time period. In some embodiments, wherein the communication signal is communicated during one or more other time symbols within the time period. In some embodiments, wherein the resources include a set of subcarriers, and wherein the reference signal is communicated using at least one subcarrier outside the resources. In some embodiments, wherein the resources include a set of subcarriers within each of a plurality of resource blocks (RBs), and wherein the reference signal is communicated based on a scrambling code that is based on at least a frequency location of the set of subcarriers. In some embodiments, wherein the communicating is based on a code-division multiplexing in at least one of a time domain or a frequency domain with another communication signal transmitted by a third wireless communication device using the resources. In some embodiments, the method further comprises transmitting, by the first wireless communication device to the second wireless communication device, the configuration, wherein the communicating includes receiving, by the first wireless communication device from the second wireless communication device, the communication signal. In some embodiments, wherein the obtaining includes receiving, by the first wireless communication device from the second wireless communication device, the configuration, and wherein the communicating includes transmitting, by the first wireless communication device to the second wireless communication device, the communication signal.

Further embodiments of the present disclosure include an apparatus comprising a processor configured to obtain a configuration for communicating a communication signal in a frequency spectrum, wherein the configuration is based on at least a number of wireless communication devices scheduled to communicate in a time period and indicates resources in the frequency spectrum over the time period and a frequency distribution mode of the resources; and a transceiver configured to communicate, with a second wireless communication device, the communication signal in the frequency spectrum during the time period based on the configuration.

In some embodiments, wherein the processor is further configured to obtain the configuration by determining the resources and the frequency distribution mode based on a power spectral density (PSD) parameter of the frequency spectrum, and wherein the scheduled wireless communication devices include the second wireless communication device. In some embodiments, wherein the processor is further configured to obtain the configuration by determining the resources and the frequency distribution mode based on at least one of a number of transmission layers scheduled for each of the scheduled wireless communication devices, a waveform of the communication signal, or a subcarrier spacing used for communicating with the second wireless communication device. In some embodiments, wherein the transceiver is further configured to communicate the communication signal by communicating a physical uplink shared channel (PUSCH) signal using the resources. In some embodiments, wherein the resources are located within K plurality of resource blocks (RBs) in the frequency spectrum over the time period, wherein a frequency spreading over M of the K plurality of RBs satisfies a power spectral density (PSD) parameter of the frequency spectrum, wherein K and M are positive integers, and wherein K is greater than or equal to M. In some embodiments, wherein the resources include a set of contiguous subcarriers. In some embodiments, wherein the resources include a set of distributed subcarriers spaced apart from each by at least one other subcarrier. In some embodiments, wherein the transceiver is further configured to communicate, with the second wireless communication device, a reference signal during one or more time symbols within the time period. In some embodiments, wherein the communication signal is communicated during one or more other time symbols within the time period. In some embodiments, wherein the resources include a set of subcarriers, and wherein the reference signal is communicated using at least one subcarrier outside the resources. In some embodiments, wherein the resources include a set of subcarriers within each of a plurality of resource blocks (RBs), and wherein the reference signal is communicated based on a scrambling code that is based on at least a frequency location of the set of subcarriers. In some embodiments, wherein the transceiver is further configured to communicate the communication signal based on a code-division multiplexing in at least one of a time domain or a frequency domain with another communication signal transmitted by a third wireless communication device using the resources. In some embodiments, wherein the transceiver is further configured to transmit, to the second wireless communication device, the configuration; and communicate the communication signal by receiving, from the second wireless communication device, the communication signal. In some embodiments, wherein the processor is further configured to obtain the configuration by receiving, from the second wireless communication device via the transceiver, the configuration, and wherein the transceiver is further configured to communicate the communication signal by transmitting, to the second wireless communication device, the communication signal.

Further embodiments of the present disclosure include a computer-readable medium having program code recorded thereon, the program code comprising code for causing a first wireless communication device to obtain a configuration for communicating a communication signal in a frequency spectrum, wherein the configuration is based on at least a number of wireless communication devices scheduled to communicate in a time period and indicates resources in the frequency spectrum over the time period and a frequency distribution mode of the resources; and code for causing the first wireless communication device to communicate, with a second wireless communication device, the communication signal in the frequency spectrum during the time period based on the configuration.

In some embodiments, wherein the code for causing the first wireless communication device to obtain the configuration is further configured to determine the resources and the frequency distribution mode based on a power spectral density (PSD) parameter of the frequency spectrum, and wherein the scheduled wireless communication devices include the second wireless communication device. In some embodiments, wherein the code for causing the first wireless communication device to obtain the configuration is further configured to determine the resources and the frequency distribution mode based on at least one of a number of transmission layers scheduled for each of the scheduled wireless communication devices, a waveform of the communication signal, or a subcarrier spacing used for communicating with the second wireless communication device. In some embodiments, wherein the code for causing the first wireless communication device to communicate the communication signal is further configured to communicate a physical uplink shared channel (PUSCH) signal using the resources. In some embodiments, wherein the resources are located within K plurality of resource blocks (RBs) in the frequency spectrum over the time period, wherein a frequency spreading over M of the K plurality of RBs satisfies a power spectral density (PSD) parameter of the frequency spectrum, wherein K and M are positive integers, and wherein K is greater than or equal to M. In some embodiments, wherein the resources include a set of contiguous subcarriers. In some embodiments, wherein the resources include a set of distributed subcarriers spaced apart from each by at least one other subcarrier. In some embodiments, the computer-readable medium further comprises code for causing the first wireless communication device to communicate, with the second wireless communication device, a reference signal during one or more time symbols within the time period. In some embodiments, wherein the communication signal is communicated during one or more other time symbols within the time period. In some embodiments, wherein the resources include a set of subcarriers, and wherein the reference signal is communicated using at least one subcarrier outside the resources. In some embodiments, wherein the resources include a set of subcarriers within each of a plurality of resource blocks (RBs), and wherein the reference signal is communicated based on a scrambling code that is based on at least a frequency location of the set of subcarriers. In some embodiments, wherein the code for causing the first wireless communication device to communicate the communication signal is further configured to communicate the communication signal based on a code-division multiplexing in at least one of a time domain or a frequency domain with another communication signal transmitted by a third wireless communication device using the resources. In some embodiments, the computer-readable medium further comprises code for causing the first wireless communication device to transmit, to the second wireless communication device, the configuration, wherein the code for causing the first wireless communication device to communicate the communication signal is further configured to receive, from the second wireless communication device, the communication signal. In some embodiments, wherein the code for causing the first wireless communication device to obtain the configuration is further configured to receive, from the second wireless communication device, the configuration, and wherein the code for causing the first wireless communication device to communicate the communication signal is further configured to transmit, to the second wireless communication device, the communication signal.

Further embodiments of the present disclosure include an apparatus comprising means for obtaining a configuration for communicating a communication signal in a frequency spectrum, wherein the configuration is based on at least a number of wireless communication devices scheduled to communicate in a time period and indicates resources in the frequency spectrum over the time period and a frequency distribution mode of the resources; and means for communicating, with a second wireless communication device, the communication signal in the frequency spectrum during the time period based on the configuration.

In some embodiments, wherein the means for obtaining the configuration is further configured to determine the resources and the frequency distribution mode based on a power spectral density (PSD) parameter of the frequency spectrum, and wherein the scheduled wireless communication devices include the second wireless communication device. In some embodiments, wherein the means for obtaining the configuration is further configured to determine the resources and the frequency distribution mode based on at least one of a number of transmission layers scheduled for each of the scheduled wireless communication devices, a waveform of the communication signal, or a subcarrier spacing used for communicating with the second wireless communication device. In some embodiments, wherein the means for communicating the communication signal is further configured to communicate a physical uplink shared channel (PUSCH) signal using the resources. In some embodiments, wherein the resources are located within K plurality of resource blocks (RBs) in the frequency spectrum over the time period, wherein a frequency spreading over M of the K plurality of RBs satisfies a power spectral density (PSD) parameter of the frequency spectrum, wherein K and M are positive integers, and wherein K is greater than or equal to M. In some embodiments, wherein the resources include a set of contiguous subcarriers. In some embodiments, wherein the resources include a set of distributed subcarriers spaced apart from each by at least one other subcarrier. In some embodiments, the apparatus further comprises means for communicating, with the second wireless communication device, a reference signal during one or more time symbols within the time period. In some embodiments, wherein the communication signal is communicated during one or more other time symbols within the time period. In some embodiments, wherein the resources include a set of subcarriers, and wherein the reference signal is communicated using at least one subcarrier outside the resources. In some embodiments, wherein the resources include a set of subcarriers within each of a plurality of resource blocks (RBs), and wherein the reference signal is communicated based on a scrambling code that is based on at least a frequency location of the set of subcarriers. In some embodiments, wherein the means for communicating the communication signal is further configured to communicate the communication signal based on a code-division multiplexing in at least one of a time domain or a frequency domain with another communication signal transmitted by a third wireless communication device using the resources. In some embodiments, the apparatus further comprises means for transmitting, to the second wireless communication device, the configuration, wherein the means for communicating the communication signal is further configured to receive, from the second wireless communication device, the communication signal. In some embodiments, wherein the means for obtaining the configuration is further configured to receive, from the second wireless communication device, the configuration, and wherein the means for communicating the communication signal is further configured to transmit, to the second wireless communication device, the communication signal.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a user equipment, a configuration for communicating a communication signal in a frequency spectrum, wherein the configuration is based on at least a number of wireless communication devices scheduled to communicate in a time period and indicates resources in the frequency spectrum over the time period, wherein the indicated resources include:
a first subset of mini-resource blocks (mini-RBs) of a first RB, the first subset of mini-RBs being less than all mini-RBs of the first RB, wherein at least a first mini-RB in the first subset includes a set of non-contiguous subcarriers, wherein each subcarrier of the set of non-contiguous subcarriers is spaced apart from other subcarriers of the set of non-contiguous subcarriers by at least one subcarrier of another mini-RB in the first RB; and
a second subset of mini-RBs of a second RB, the second subset of mini-RBs being less than all mini-RBs of the second RB; and
communicating, by the user equipment with a base station, the communication signal in the frequency spectrum during the time period using the indicated resources based on the configuration.

2. The method of claim 1, wherein the configuration is further based on a power spectral density (PSD) parameter of the frequency spectrum, and wherein the scheduled wireless communication devices include the user equipment.

3. The method of claim 1, wherein the configuration is further based on at least one of a number of transmission layers scheduled for each of the scheduled wireless communication devices, a waveform of the communication signal, or a subcarrier spacing.

4. The method of claim 1, wherein the communicating includes:
communicating a physical uplink shared channel (PUSCH) signal using the resources.

5. The method of claim 1, wherein the resources are located within K plurality of RBs in the frequency spectrum over the time period, wherein a frequency spreading over M of the K plurality of RBs satisfies a power spectral density (PSD) parameter of the frequency spectrum, wherein K and M are positive integers, wherein K is greater than or equal to M, and wherein the plurality of RBs includes the first RB and the second RB.

6. The method of claim 1, further comprising:
communicating, by the user equipment with the base station, a reference signal during one or more time symbols within the time period,
wherein the communication signal is communicated during one or more other time symbols within the time period.

7. The method of claim 6, wherein the reference signal is communicated using at least one subcarrier outside the resources.

8. The method of claim 6, wherein the resources include subcarriers within each of a plurality of RBs including the first RB and the second RB, and wherein the reference signal is communicated based on a scrambling code that is based on at least a frequency location of the subcarriers.

9. The method of claim 1, wherein the communicating is based on a code-division multiplexing in at least one of a time domain or a frequency domain with another communication signal transmitted by a third wireless communication device using the resources.

10. The method of claim 1, wherein the communicating includes receiving, by the user equipment from the base station, the communication signal.

11. The method of claim 1, wherein the communicating includes transmitting, by the user equipment to the base station, the communication signal.

12. An apparatus comprising:
a processor configured to obtain a configuration for communicating a communication signal in a frequency spectrum, wherein the configuration is based on at least a number of wireless communication devices scheduled to communicate in a time period and indicates resources in the frequency spectrum over the time period, wherein the indicated resources include:
a first subset of mini-resource blocks (mini-RBs) of a first RB, the first subset of mini-RBs being less than all mini-RBs of the first RB, wherein at least a first mini-RB in the first subset includes a set of non-contiguous subcarriers, wherein each subcarrier of the set of non-contiguous subcarriers is spaced apart from other subcarriers of the set of non-contiguous subcarriers by at least one subcarrier of another mini-RB in the first RB; and
a second subset of mini-RBs of a second RB, the second subset of mini-RBs being less than all mini-RBs of the second RB; and
a transceiver in communication with the processor, the transceiver configured to:

receive the configuration; and
communicate, with a base station, the communication signal in the frequency spectrum during the time period using the indicated resources based on the configuration.

13. The apparatus of claim 12, wherein the configuration is further based on a power spectral density (PSD) parameter of the frequency spectrum, and wherein the scheduled wireless communication devices include the apparatus.

14. The apparatus of claim 12, wherein the configuration is further based on at least one of a number of transmission layers scheduled for each of the scheduled wireless communication devices, a waveform of the communication signal, or a subcarrier spacing.

15. The apparatus of claim 12, wherein the transceiver is further configured to communicate the communication signal by communicating a physical uplink shared channel (PUSCH) signal using the resources.

16. The apparatus of claim 12, wherein the transceiver is further configured to:
communicate, with the base station, a reference signal during one or more time symbols within the time period,
wherein the communication signal is communicated during one or more other time symbols within the time period.

17. The apparatus of claim 12, wherein the transceiver is further configured to:
communicate, with the base station, a reference signal during one or more time symbols within the time period,
wherein the resources include subcarriers within each of a plurality of RBs including the first RB and the second RB, and
wherein the reference signal is communicated based on a scrambling code that is based on at least a frequency location of the subcarriers.

18. The apparatus of claim 12, wherein the transceiver is further configured to communicate the communication signal based on a code-division multiplexing in at least one of a time domain or a frequency domain with another communication signal transmitted by a third wireless communication device using the resources.

19. The apparatus of claim 12, wherein the transceiver is further configured to:
communicate the communication signal by receiving, from the base station, the communication signal.

20. The apparatus of claim 12, wherein the transceiver is further configured to communicate the communication signal by transmitting, to the base station, the communication signal.

21. A non-transitory computer-readable medium having program code recorded thereon, the program code comprising:
code for causing a user equipment to obtain a configuration for communicating a communication signal in a frequency spectrum, wherein the configuration is based on at least a number of wireless communication devices scheduled to communicate in a time period and indicates resources in the frequency spectrum over the time period, wherein the indicated resources include:
a first subset of mini-resource blocks (mini-RBs) of a first RB, the first subset of mini-RBs being less than all mini-RBs of the first RB, wherein at least a first mini-RB in the first subset includes a set of non-contiguous subcarriers, wherein each subcarrier of the set of non-contiguous subcarriers is spaced apart from other subcarriers of the set of non-contiguous subcarriers by at least one subcarrier of another mini-RB in the first RB; and a second subset of mini-RBs of a second RB, the second subset of mini-RBs being less than all mini-RBs of the second RB; and code for causing the user equipment to communicate, with a base station, the communication signal in the frequency spectrum during the time period using the indicated resources based on the configuration.

22. The non-transitory computer-readable medium of claim 21, wherein the configuration is further based on at least one of:

a power spectral density (PSD) parameter of the frequency spectrum, wherein the scheduled wireless communication devices include the user equipment, a number of transmission layers scheduled for each of the scheduled wireless communication devices, a waveform of the communication signal, or a subcarrier spacing.

23. The non-transitory computer-readable medium of claim 21, wherein the code for causing the user equipment to communicate the communication signal is further configured to communicate a physical uplink shared channel (PUSCH) signal using the resources.

24. The non-transitory computer-readable medium of claim 21, further comprising:

code for causing the user equipment to communicate, with the base station, a reference signal during one or more time symbols within the time period, wherein the communication signal is communicated during one or more other time symbols within the time period.

25. The non-transitory computer-readable medium of claim 21, further comprising:

code for causing the user equipment to communicate, with the base station, a reference signal during one or more time symbols within the time period, wherein the resources include subcarriers within each of a plurality of RBs including the first RB and the second RB, and wherein the reference signal is communicated based on a scrambling code that is based on at least a frequency location of the subcarriers.

26. The non-transitory computer-readable medium of claim 21, wherein the code for causing the user equipment to communicate the communication signal is further configured to receive, from the base station, the communication signal.

27. The non-transitory computer-readable medium of claim 21, wherein the code for causing the user equipment to communicate the communication signal is further configured to transmit, to the base station, the communication signal.

* * * * *